US012641500B2

(12) United States Patent
Jassal et al.

(10) Patent No.: US 12,641,500 B2
(45) Date of Patent: *May 26, 2026

(54) USER EQUIPMENT-CENTRIC INTER-CELL MOBILITY

(71) Applicants: Aman Jassal, Stittsville (CA); Usa Vilaipornsawai, Nepean (CA); Hua Xu, Ottawa (CA)

(72) Inventors: Aman Jassal, Stittsville (CA); Usa Vilaipornsawai, Nepean (CA); Hua Xu, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/882,852

(22) Filed: Aug. 8, 2022

(65) Prior Publication Data

US 2022/0386203 A1 Dec. 1, 2022

Related U.S. Application Data

(63) Continuation of application No. 16/827,923, filed on Mar. 24, 2020, now Pat. No. 11,452,011.

(Continued)

(51) Int. Cl.
*H04W 36/00* (2009.01)
*H04B 7/06* (2006.01)
(Continued)

(52) U.S. Cl.
CPC .... *H04W 36/0072* (2013.01); *H04B 7/06964* (2023.05); *H04B 7/06968* (2023.05);
(Continued)

(58) Field of Classification Search
CPC ............. H04W 36/0072; H04W 16/28; H04W 36/0085; H04W 36/08; H04W 72/046; H04B 7/0695; H04B 7/088
See application file for complete search history.

(56) References Cited

U.S. PATENT DOCUMENTS

2018/0083680 A1 3/2018 Guo et al.
2018/0205469 A1 7/2018 Nagaraja et al.
(Continued)

FOREIGN PATENT DOCUMENTS

CN 104885391 A 9/2015
CN 107231825 A 10/2017
(Continued)

OTHER PUBLICATIONS

3GPP TSG-RAN WG2 NR Ad-Hoc, R2-1706730, "Measurement configuration and procedures for SS and CSI-RS", Huawei, HiSilicon, Qingdao, China, Jun. 27-29, 2017, total 6 pages.
(Continued)

*Primary Examiner* — Nam T Huynh

(57) ABSTRACT

An indication signal is used for indicating to a UE a communication resource for a second reference signal that is part of a higher-layer configuration from a first base station. The communication resource for the second reference signal is associated with a second base station. The higher-layer configuration also includes a communication resource for a first reference signal associated with the first base station. A UE that receives an indication signal communicates with the second base station. A data transmission or a control signal transmission could be communicated with the second base station using a respective data channel or control channel. The data channel or control channel is associated with the communication resource for the second reference signal.

21 Claims, 13 Drawing Sheets

300

(Optional)
Receive higher-layer configuration from first base station
302

(Optional)
Perform/Report channel measurements to first base station
304

Receive indication signal from first base station
306

Communicate with second base station
308

(Optional)
Perform/Report channel measurements to second base station
310

Related U.S. Application Data

(60) Provisional application No. 62/826,230, filed on Mar. 29, 2019.

(51) Int. Cl.

| | |
|---|---|
| *H04B 7/08* | (2006.01) |
| *H04W 16/28* | (2009.01) |
| *H04W 72/044* | (2023.01) |
| *H04W 36/08* | (2009.01) |

(52) U.S. Cl.
CPC ............ *H04B 7/088* (2013.01); *H04W 16/28* (2013.01); *H04W 36/0085* (2018.08); *H04W 72/046* (2013.01); *H04W 36/085* (2023.05)

(56) References Cited

U.S. PATENT DOCUMENTS

| | | | |
|---|---|---|---|
| 2018/0234912 A1 | 8/2018 | Islam et al. | |
| 2018/0302889 A1 | 10/2018 | Guo et al. | |
| 2019/0037498 A1 | 1/2019 | Tseng et al. | |
| 2019/0068346 A1 | 2/2019 | Akkarakaran et al. | |
| 2019/0081687 A1 | 3/2019 | Sadiq et al. | |
| 2019/0199412 A1 | 6/2019 | Koskela et al. | |
| 2019/0208448 A1 | 7/2019 | Peng et al. | |
| 2019/0230545 A1 | 7/2019 | Liou et al. | |
| 2020/0112886 A1* | 4/2020 | John Wilson | H04W 36/18 |
| 2020/0145983 A1 | 5/2020 | Levitsky et al. | |
| 2020/0205193 A1 | 6/2020 | Amuru et al. | |
| 2020/0288359 A1* | 9/2020 | Kim | H04W 36/026 |
| 2020/0351055 A1* | 11/2020 | Manolakos | H04L 5/0053 |
| 2020/0389883 A1* | 12/2020 | Faxér | H04L 5/0053 |
| 2021/0083813 A1* | 3/2021 | Wu | H04W 36/0072 |
| 2021/0168744 A1* | 6/2021 | Matsumura | H04L 27/2675 |
| 2021/0185754 A1 | 6/2021 | Da Silva et al. | |
| 2021/0314927 A1* | 10/2021 | Noh | H04L 5/0053 |
| 2023/0132757 A1* | 5/2023 | Kang | H04B 7/08 |
| | | | 370/329 |

FOREIGN PATENT DOCUMENTS

| | | | |
|---|---|---|---|
| WO | 2012085620 A1 | 6/2012 |
| WO | 2017221202 A1 | 12/2017 |
| WO | 2018061349 A1 | 4/2018 |
| WO | 2018124675 A1 | 7/2018 |
| WO | 2018128970 A1 | 7/2018 |
| WO | 2019032017 A1 | 2/2019 |
| WO | 2019032939 A1 | 2/2019 |
| WO | 2019049096 A1 | 3/2019 |

OTHER PUBLICATIONS

3GPP TSG RAN WG1 NR Ad-Hoc#2, R1-1711576, "L3 Mobility based on CSI-RS based Measurements", CATT, Qingdao, P.R. China, Jun. 27-30, 2017, total 7 pages.

3GPP TSG RAN WG2 NR Ad Hoc, R2-1706968, "CSI-RS configuration procedure for RRM measurement in RRC_Connected state", Qingdao, China, Jun. 27-29, 2017, vivo, total 5 pages.

3GPP TSG-RAN WG2 Meeting #100, R2-1712766, "Remaining issues for measurement object",vivo, Reno, USA, Nov. 27-Dec. 1, 2017, total 3 pages.

"3rd Generation Partnership Project; Technical Specification Group Radio Access Network; NR; Radio Resource Control (RRC) protocol specification (Release 15)". Technical specification. 3GPP TS 38.331 V15.4.0. Dec. 2018, 474 pages.

"3rd Generation Partnership Project; Technical Specification Group Radio Access Network; NR; Medium Access Control (MAC) protocol specification (Release 15)". Technical specification. 3GPP TS 38.321 V15.4.0. Dec. 2018, 77 pages.

Ericsson, "Draft CR to 36.331 on support of flow based QoS framework for LTE connected to 5GC", 3GPP TSG-RAN WG2 Meeting #103, R2-1811164, Gothenburg, Sweden, Aug. 20-24, 2018, 11 pages.

3GPP TSG RAN WG1 NR Ad-Hoc Meeting, R1-1711422,Resource allocation for data channels,Huawei, HiSilicon, Qingdao, China, Jun. 27, 30, 2017,total 5 pages.

* cited by examiner

300

| (Optional) |
| Receive higher-layer configuration from first base station |
| 302 |

| (Optional) |
| Perform/Report channel measurements to first base station |
| 304 |

| Receive indication signal from first base station |
| 306 |

| Communicate with second base station |
| 308 |

| (Optional) |
| Perform/Report channel measurements to second base station |
| 310 |

400

(Optional)
Transmit higher-layer configuration to UE
402

(Optional)
Receive channel measurements from UE
404

No transition by UE

UE
Mobility
decision
406

UE transition

Generate indication signal
408

Transmit indication signal to UE
410

600

900

1100

1200

USER EQUIPMENT-CENTRIC INTER-CELL MOBILITY

CROSS-REFERENCE TO RELATED APPLICATIONS

The present application is a continuation of U.S. patent application Ser. No. 16/827,923, filed on Mar. 24, 2020 and entitled "USER EQUIPMENT-CENTRIC INTER-CELL MOBILITY", which claims the benefit of U.S. Provisional Application No. 62/826,230, filed on Mar. 29, 2019 and entitled "USER EQUIPMENT-CENTRIC INTER-CELL MOBILITY", the entire contents of both of which are incorporated herein by reference.

FIELD

The present disclosure relates generally to wireless communications and, in particular, to User Equipment mobility between different cells in a wireless communication network.

BACKGROUND

In traditional cellular networks, each transmit/receive point (TRP) is associated with a coverage area or a traditional TRP-based cell and is assigned a traditional cell identifier (cell ID) to define a control channel and a data channel so that simultaneous TRP to UE or UE to TRP communications can be supported for each traditional cell. The network may maintain the association between a serving TRP and a UE through the assigned traditional cell ID until a handover is triggered.

As the demand on mobile broadband increases, traditional cellular networks are deployed more densely and heterogeneously with a greater number of TRPs. Traditional cell ID assignment becomes more difficult and the occurrence rate of handovers increases as the UE moves between TRPs.

Current solutions deployed in cellular networks such as Long Term Evolution (LTE) and New Radio (NR) Release 15 address two types of UE mobility, including mobility within cells and mobility between cells. Intra-cell mobility within cells involves management of cell-specific communication resources and cell-specific configurations. Antenna beams represent an example of such communication resources, and so-called beam management could be used in some network implementations for intra-cell mobility within one cell. Inter-cell mobility between cells is also referred to as mobility management.

Beam management was introduced in NR for the purpose of handling mobility within a given cell. This involves procedures used such as Beam Failure Detection (BFD) and Beam Failure Recovery (BFR). In mobility management, however, a UE experiences mobility interruption time during which there is an interruption in communications, because a UE first releases its link with a source cell and then establishes a new link with a target cell. Mobility management involves higher-layer signaling exchange between the UE and network equipment.

SUMMARY

Aspects of the present disclosure relate to avoiding interruption in UE communications when a UE is moving from one cell to another, for example by enabling the problem of mobility between cells to be treated similarly to the problem of mobility within cells. Inter-cell mobility management could then be an extension of intra-cell mobility management, without introducing interruptions in connectivity and communications as a UE is moving between cells. A beam switching command, for example, could be sent to and executed by a UE without interrupting connectivity and communications.

A method according to an aspect of the present disclosure involves receiving, by a UE from a first base station, an indication signal. The indication signal is for indicating to the UE a communication resource for a second reference signal associated with a second base station. The communication resource for the second reference signal is comprised in a higher-layer configuration from the first base station to the UE, and the higher-layer configuration further comprises a communication resource for a first reference signal associated with the first base station. A method may also involve communicating, by the UE with the second base station, a data transmission or a control signal transmission using a respective data channel or control channel. The data channel or control channel is associated with the communication resource for the second reference signal.

Another method involves generating, by a first base station, an indication signal for indicating to a UE a communication resource for a second reference signal associated with a second base station. The communication resource for the second reference signal is comprised in a higher-layer configuration from the first base station to the UE, and the higher-layer configuration further comprises a communication resource for a first reference signal associated with the first base station. A method may also involve transmitting the indication signal from the first base station to the UE. The indication signal is transmitted to the UE to enable the UE to communicate, with the second base station, a data transmission or a control signal transmission using a respective data channel or control channel. The data channel or control channel is associated with the communication resource for the second reference signal.

According to another aspect of the present disclosure, a UE includes a processor and a non-transitory computer readable storage medium storing programming for execution by the processor. The programming includes instructions to receive, from a first base station, an indication signal. The indication signal is for indicating to the UE a communication resource for a second reference signal associated with a second base station. The communication resource for the second reference signal is comprised in a higher-layer configuration from the first base station to the UE, and the higher-layer configuration further comprises a communication resource for a first reference signal associated with the first base station. The programming also includes instructions to communicate, with the second base station, a data transmission or a control signal transmission using a respective data channel or control channel. The data channel or control channel associated with the communication resource for the second reference signal.

A base station may include a processor and a non-transitory computer readable storage medium storing programming for execution by the processor. The programming includes instructions to generate, by the base station, an indication signal for indicating to a UE a communication resource for a second reference signal associated with a second base station. As noted above, the communication resource for the second reference signal is comprised in a higher-layer configuration from the base station to the UE, and the higher-layer configuration further comprises a communication resource for a first reference signal associated with the base station. The programming also includes instructions to transmit the indication signal from the base station to the UE, to enable the UE to communicate, with the second base station, a data transmission or a control signal transmission using a respective data channel or control channel associated with the communication resource for the second reference signal.

Other aspects of the present disclosure relate to a computer program product comprising a non-transitory computer readable storage medium storing programming, and to such a non-transitory computer readable storage medium storing programming. For example, the programming may include instructions to perform a method as disclosed herein. In an embodiment, the programming includes instructions to receive, from a first base station, an indication signal for indicating a communication resource for a second reference signal associated with a second base station. The communication resource for the second reference signal is comprised in a higher-layer configuration from the first base station, and the higher-layer configuration further comprises a communication resource for a first reference signal associated with the first base station. The programming may also include instructions to communicate, with the second base station, a data transmission or a control signal transmission using a respective data channel or control channel. The data channel or control channel is associated with the communication resource for the second reference signal.

As another example, the programming may include instructions to generate, by a base station, an indication signal for indicating to a UE a communication resource for a second reference signal associated with a second base station. The communication resource for the second reference signal is comprised in a higher-layer configuration from the base station to the UE, and the higher-layer configuration further comprises a communication resource for a first reference signal associated with the base station. The programming may also include instructions to transmit the indication signal from the base station to the UE. The indication signal is transmitted to the UE to enable the UE to communicate, with the second base station, a data transmission or a control signal transmission using a respective data channel or control channel. The data channel or control channel is associated with the communication resource for the second reference signal.

According to a further aspect of the present disclosure, a method involves a UE receiving an indication signal from a first base station. The indication signal is for indicating to the UE a communication resource of a second reference signal from a higher-layer configuration from the first base station. The higher-layer configuration includes not only a communication resource for a first reference signal associated with the first base station, but also the communication resource for the second reference signal associated with a second base station. Such a method could also involve the UE communicating with the second base station. A data transmission or a control signal transmission could be communicated with the second base station using a respective data channel or control channel. The data channel or control channel is associated with the communication resource of the second reference signal.

Another method involves generating, by a first base station, an indication signal and transmitting the indication signal from the first base station to a UE. As described above and elsewhere herein, the indication signal is for indicating to the UE a communication resource of a second reference signal from a higher-layer configuration from the first base station, and the higher-layer configuration includes a communication resource for a first reference signal associated with the first base station and the communication resource for the second reference signal associated with a second base station. The indication signal is transmitted from the first base station to the UE to enable the UE to communicate with the second base station, a data transmission or a control signal transmission using a respective data channel or control channel. The data channel or control channel is associated with the communication resource of the second reference signal.

A UE could include a processor and a non-transitory computer readable storage medium storing programming for execution by the processor. In an embodiment, the programming includes instructions to receive, by the UE from a first base station, an indication signal for indicating to the UE a communication resource of a second reference signal from a higher-layer configuration from the first base station, and to communicate, by the UE with the second base station. The higher-layer configuration includes both a communication resource for a first reference signal associated with the first base station and the communication resource for the second reference signal associated with a second base station. The UE could communicate, with the second base station, a data transmission or a control signal transmission using a respective data channel or control channel. The data channel or control channel is associated with the communication resource of the second reference signal.

The present disclosure also relates in part to a base station, which in an embodiment includes a processor and a non-transitory computer readable storage medium storing programming for execution by the processor, with the programming including instructions to generate, by the base station, an indication signal for indicating to a user equipment (UE) a communication resource of a second reference signal from a higher-layer configuration from the base station to the UE, and to transmit the indication signal from the base station to the UE. As in other embodiments referenced above and elsewhere herein, the higher-layer configuration includes a communication resource for a first reference signal associated with the base station and the communication resource for the second reference signal associated with a second base station. The base station transmits the indication signal to the UE to enable the UE to communicate with the second base station, a data transmission or a control signal transmission using a respective data channel or control channel associated with the communication resource of the second reference signal.

Embodiments could also or instead be implemented in other ways. For example, a computer program product could include a non-transitory computer readable storage medium storing programming, with the programming including instructions to perform a method as disclosed herein.

In a computer program product including a non-transitory computer readable storage medium storing programming, the programming could include instructions to receive, by a UE from a first base station, an indication signal, and to communicate, by the UE, with a second base station. The indication signal is for indicating to the UE a communication resource of a second reference signal from a higher-layer configuration from the first base station, and the higher-layer configuration includes both a communication resource for a first reference signal associated with the first base station and the communication resource for the second reference signal associated with the second base station. UE communications with the second base station could include, a data transmission or a control signal transmission using a respective data channel or control channel associated with the communication resource of the second reference signal.

Another example of a computer program product includes a non-transitory computer readable storage medium storing programming, and the programming includes instructions to generate, by a first base station, an indication signal for indicating to a UE a communication resource of a second reference signal from a higher-layer configuration from the first base station to the UE, and to transmit the indication signal from the first base station to the UE. The higher-layer configuration includes both a communication resource for a first reference signal associated with the first base station and the communication resource for the second reference signal associated with a second base station. Transmission of the indication to the UE is to enable the UE to communicate with the second base station, a data transmission or a control signal transmission using a respective data channel or control channel associated with the communication resource of the second reference signal.

Other aspects and features of embodiments of the present disclosure will become apparent to those ordinarily skilled in the art upon review of the following description.

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION

As noted above, as the demand on mobile broadband increases, traditional cellular networks are deployed more densely and heterogeneously with a greater number of TRPs, and the occurrence rate of handovers as the UE moves between TRPs increases. This could be an issue in respect of interrupting communications during inter-cell mobility for example.

In NR Release 15, network equipment can update Quasi-Colocation (QCL) assumptions within the same cell (e.g., beam switching). This approach, however, is used only for intra-cell mobility within one cell and is not used for inter-cell mobility. Inter-cell mobility requires Radio Resource Control (RRC) signaling (e.g., handover) to reconfigure/update QCL information or a QCL configuration such as QCL assumptions for a new serving cell, during which UE connectivity and communications are interrupted. QCL assumptions are indications indicated by the network to a UE, associating two different antenna ports (e.g. reference signals) with a certain type of property (e.g. Doppler shift, Doppler spread, delay spread, average delay, spatial receive information). QCL assumptions are used to indicate to the UE that channel properties (such as Doppler shift, Doppler spread, delay spread, average delay, spatial receive information) of one antenna port can be inferred from the channel properties of another antenna port.

In accordance with a "universal" QCL framework disclosed herein, a UE maintains a QCL assumption record such as a list, separately from serving cell configurations, and network equipment instructs the UE as to which QCL assumptions to use for physical layer control/data channels. Such instruction of the UE by network equipment could be on a semi-static or dynamic basis. A universal QCL framework in which QCL assumptions are maintained separately from cell-specific configurations could also be described as non-cell-specific, UE-centric, and/or cell-agnostic, for example.

Embodiments could also or instead provide inter-cell resource management, such as beam management, for intra-frequency dual connectivity between different cells. Control/data channels could originate from the same cell or different cells. Communication resource configuration that is "externalized" or separated from service cell configuration could enable inter-cell mobility to be managed in the same or a similar manner as intra-cell mobility, through beam management for example.

Figure 1:
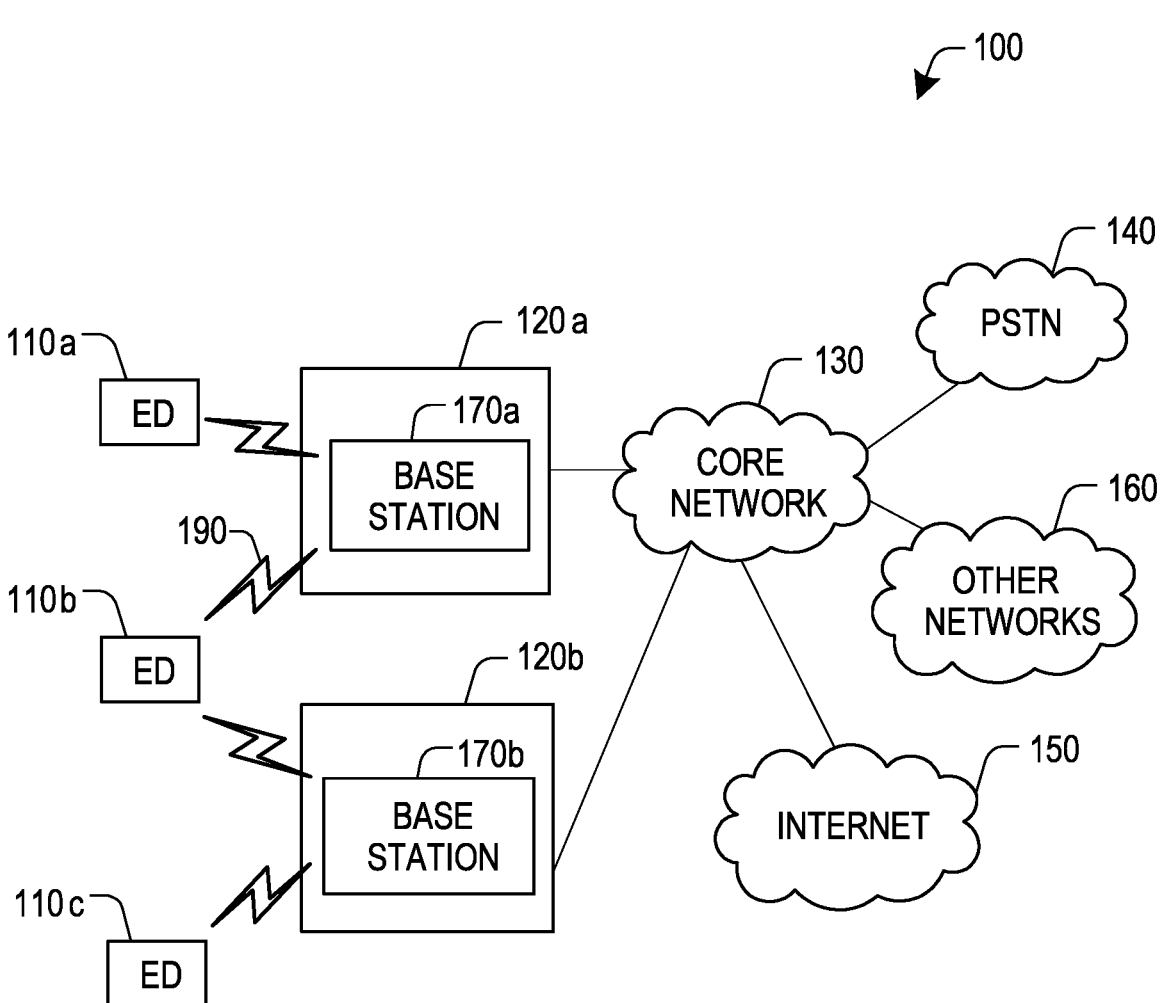
FIG. 1 illustrates an example communication system in which embodiments of the present disclosure could be implemented.

FIG. 1 illustrates an example communication system 100 in which embodiments of the present disclosure could be implemented. In general, the system 100 enables multiple wireless or wired elements to communicate data and/or other content. The purpose of the system 100 may be to provide content (e.g., any one or more of voice, data, video, text) via broadcast, narrowcast, user device to user device, etc. The system 100 may operate efficiently by sharing communication resources such as bandwidth.

In this example, the communication system 100 includes electronic devices (ED) 110a-110c, radio access networks (RANs) 120a-120b, a core network 130, a public switched telephone network (PSTN) 140, the Internet 150, and other networks 160. While certain numbers of these components or elements are shown in FIG. 1, any reasonable number of these components or elements may be included in the system 100.

The EDs 110a-110c are configured to operate, communicate, or both, in the system 100. For example, the EDs 110a-110c are configured to transmit, receive, or both via wireless communication channels. Each ED 110a-110c represents any suitable end user device for wireless operation and may include such devices (or may be referred to) as a user equipment/device (UE), wireless transmit/receive unit (WTRU), mobile station, mobile subscriber unit, cellular telephone, station (STA), machine type communication device (MTC), personal digital assistant (PDA), smartphone, laptop, computer, touchpad, wireless sensor, or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the Internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB or gNB (sometimes called a "gigabit" NodeB), a transmission point (TP), a transmit/receive point (TRP), a site controller, an access point (AP), or a wireless router. Any ED 110a-110c may be alternatively or jointly configured to interface, access, or communicate with any other base station 170a-170b, the internet 150, the core network 130, the PSTN 140, the other networks 160, or any combination of the preceding. Optionally, the system may include RANs, such as RAN 120b, wherein the corresponding base station 170b accesses the core network 130 via the internet 150, as shown.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b may be configured to operate to transmit and/or receive wireless signals within a particular geographic region or area, sometimes referred to as a coverage area. A cell may be further divided into cell sectors, and a base station 170a-170b may, for example, employ multiple transceivers to provide service to multiple sectors. In some embodiments a base station 170a-170b may be implemented as pico or femto nodes where the radio access technology supports such. In some embodiments, multiple-input multiple-output (MIMO) technology may be employed having multiple transceivers for each coverage area. The number of RANs 120a-120b shown is exemplary only. Any number of RANs may be contemplated when devising the system 100.

The base stations 170a-170b communicate with one or more of the EDs 110a-110c over one or more air interfaces 190 using wireless communication links e.g. RF, μWave, IR, etc. The air interfaces 190 may utilize any suitable radio access technology. For example, the system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as HSPA, HSPA+ optionally including HSDPA, HSUPA or both. Alternatively, a base station 170a-170b may establish an air interface 190 with Evolved UTMS Terrestrial Radio Access (E-UTRA) using LTE, LTE-A, and/or LTE-B. It is contemplated that the system 100 may use multiple channel access functionality, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. Understandably, the RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the Internet 150, and the other networks 160). In addition, some or all of the EDs 110a-110c may include functionality for communicating with different wireless networks over different wireless links using different wireless technologies and/or protocols. PSTN 140 may include circuit switched telephone networks for providing plain old telephone service (POTS). Internet 150 may include a network of computers and subnets (intranets) or both, and incorporate protocols, such as IP, TCP, UDP. EDs 110a-110c may be multimode devices capable of operation according to multiple radio access technologies, and incorporate multiple transceivers necessary to support such technologies.

It is contemplated that the communication system 100 as illustrated in FIG. 1 may support an NR cell, which also may be referred to as a hyper cell. Each NR cell includes one or more base stations using the same NR cell ID. The NR cell ID is a logical assignment to all physical base stations of the NR cell and may be carried in a broadcast synchronization signal. The NR cell may be dynamically configured. The boundary of the NR cell may be flexible, to support dynamically adding base stations to and/or removing base stations from the NR cell.

In one embodiment, an NR cell may have one or more base stations within the NR cell transmitting a UE-specific data channel, which serves a UE. The one or more base stations associated with the UE-specific data channel are also UE-specific and are transparent to the UE. Multiple parallel data channels within a single NR cell may be supported, with each data channel serving a different UE for example.

In another embodiment, a broadcast common control channel and a dedicated control channel may be supported. The broadcast common control channel could be used to carry common system configuration information transmitted by all or some base stations that share the same NR cell ID. Each UE can decode information from the broadcast common control channel in accordance with information tied to the NR cell ID. One or more base stations within a NR cell could transmit a UE-specific dedicated control channel, which serves a UE and carries UE-specific control information associated with the UE. Multiple parallel dedicated control channels within a single NR cell may be supported, with each dedicated control channel serving a different UE for example. The demodulation of each dedicated control channel could be performed in accordance with a UE-specific reference signal (RS), the sequence and/or location of which are linked to the UE ID and/or other UE specific parameters.

In some embodiments, one or more of these channels, including the dedicated control channels and the data channels, may be generated in accordance with a UE-specific parameter, such as a UE ID, and/or an NR cell ID. Further, the UE-specific parameter and/or the NR cell ID could be used to differentiate transmissions of the data channels and control channels from different NR cells.

An ED, such as a UE, could access the communication system 100 through at least one of the base stations within an NR cell using a UE dedicated connection ID, which allows one or more physical base stations associated with the NR cell to be transparent to the UE. The UE dedicated connection ID is an identifier that uniquely identifies the UE in the NR cell. For example, the UE dedicated connection ID could be identified by a sequence. In some implementations, the UE dedicated connection ID is assigned to the UE after an initial access. The UE dedicated connection ID, for example, may be linked to other sequences and randomizers which are used for physical (PHY) channel generation.

In some embodiments, the UE dedicated connection ID remains the same as long as the UE is communicating with any base station within the NR cell. In some embodiments, the UE can keep an original UE dedicated connection ID when crossing an NR cell boundary. For example, the UE could only change its UE dedicated connection ID after receiving signaling from the network.

It should be understood that any number of NR cells may be implemented in the communication system 100. For example, FIG. 2 illustrates two neighboring NR cells in an example communication system, in accordance with an embodiment of the present disclosure.

Figure 2:
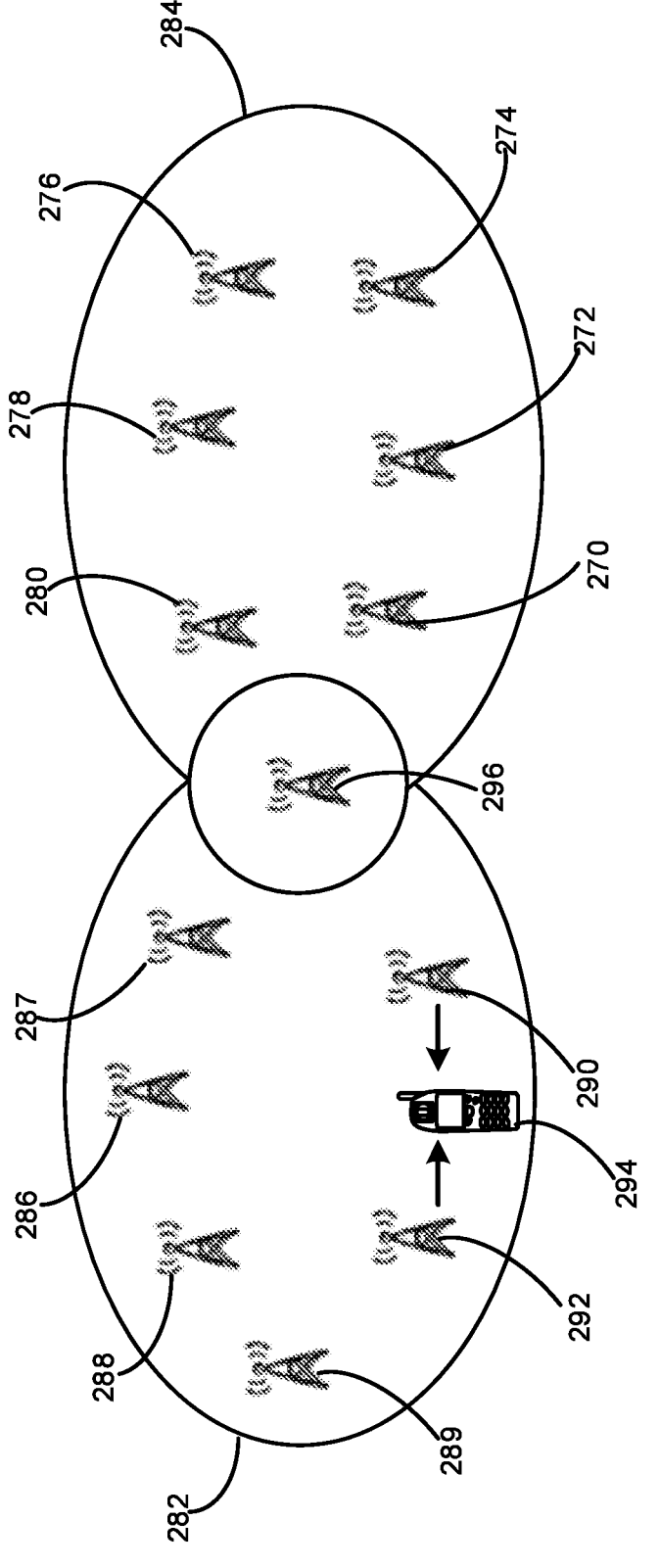
FIG. 2 illustrates two neighboring NR cells of an example communication system in which embodiments of the present disclosure could be implemented.

As illustrated in FIG. 2, each of the two NR cells 282, 284 includes multiple TRPs that are assigned the same NR cell ID. For example, NR cell 282 includes TRPs 286, 287, 288, 289, 290, and 292, where TRPs 290, 292 communicate with an ED, such as UE 294. It should be understood that other TRPs in NR cell 282 may communicate with UE 294. NR cell 284 includes TRPs 270, 272, 274, 276, 278, and 280. TRP 296 is assigned to NR cells 282, 284 at different times, frequencies or spatial directions and the NR cell ID for TRP 296 may be switched, such as by the system, between the two NR cells 282 and 284. It is contemplated that any number (including zero) of shared TRPs between NR cells may be implemented in a system.

In one embodiment, the NR cell topology is dynamically updated to adapt to changes in network topology, load distribution, and/or UE distribution. In some implementations, if the concentration of UEs increases in one region, then the NR cell may be dynamically expanded to include TRPs near the higher concentration of UEs. For example, an NR cell may be expanded to include other TRPs if the concentration of UEs located at the edge of the NR cell increases above a certain threshold. As another example, an NR cell may be expanded to include a greater concentration of UEs located between two hyper cells. In some implementations, if the traffic load increases significantly at one region, the NR cell associated with the region may be expanded to include TRPs for the increased traffic load. For example, if the traffic load of a portion of the network exceeds a predetermined threshold, then the NR cell ID of one or more TRPs that are transmitting to the impacted portion of the network may be changed.

In another embodiment, the NR cell ID associated with TRP 296 may be changed from the NR cell ID of NR cell

282 to the NR cell ID of NR cell 284. In one implementation, the association of a TRP with different NR cells can be changed periodically, such as every 1 millisecond. With such a flexible NR cell formation mechanism, UEs can be served by the best TRP(s) so that virtually there are no cell edge UEs.

In yet another embodiment, the shared TRP 296 can reduce interference for UEs located at the boundary between the two NR cells 282, 284. UEs that are located near the boundaries of two NR cells such as 282, 284 experience fewer handovers because the shared TRP 296 is associated with either NR cell at different times, frequencies or spatial directions. Further, as a UE moves between the NR cells 282, 284, the transition is a smoother experience for the user. In one embodiment, the NR cell ID of the TRP 296 is changed to transition a UE moving between NR cells 282, 284.

TRP selection techniques may be applied to minimize intra-NR cell interference and inter-NR cell interference. In one embodiment, a TRP sends a downlink channel state information (CSI)-reference symbol (RS). Some pilot (also known as reference signal) ports may be defined such that the UEs can measure channel state information and report channel state information back to the network. A CSI-RS port is a pilot port defined as a set of known symbols from a sequence transmitted over known resource elements (for example Orthogonal Frequency Division Multiplexing (OFDM) resource elements) for UEs to measure the channel state. A UE assigned to measure a particular CSI-RS port can measure the transmitted CSI-RS sequence, measure the associated channel state and report channel state information back to the network. Network equipment, such as a controller, may select the best TRPs for all served UEs based on the downlink measurements. In another embodiment, a TRP detects an uplink sounding reference signal (SRS) sequence from a UE in the configured time-frequency resources. For example, Constant Amplitude Zero Auto Correlation (CA-ZAC) sequences such as ZC sequences can be used as base sequences for SRS. The TRP reports a measurement of the detected uplink SRS sequence to network equipment, such as a controller. The controller then selects the optimal TRPs for all served UEs based on the measurements.

Within a communication system, examples of which are described with reference to FIGS. 1 and 2, embodiments disclosed herein provide for inter-cell UE mobility that does not involve interrupting UE communications during reconfiguration.

Figure 3:
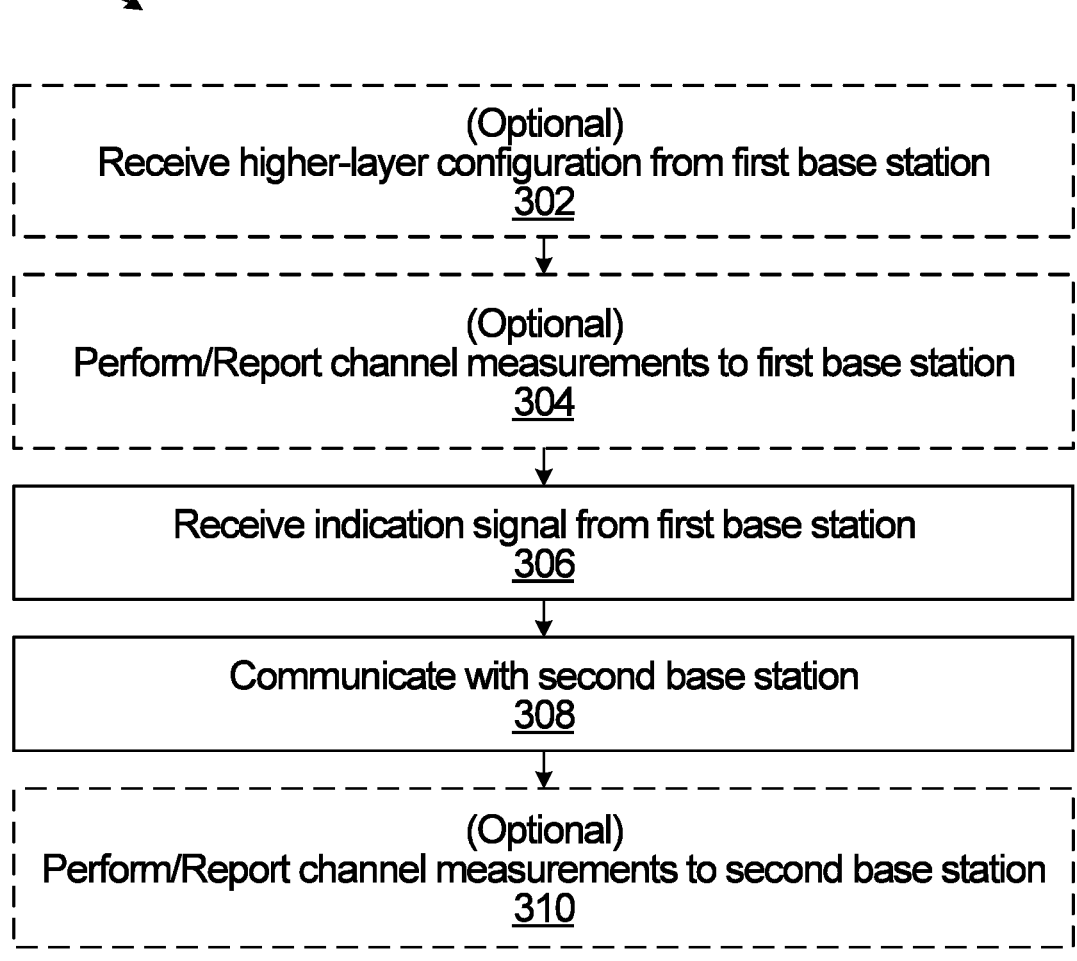
FIG. 3 is a flow diagram illustrating a method according to an embodiment.

FIG. 3 is a flow diagram illustrating a method according to an embodiment. The method 300 is a representative example of a method that could be performed at a UE.

For the purposes of UE mobility, the operations at 306, 308 are of particular relevance. The operation at 306 involves receiving, by a UE, an indication signal from a first base station. The indication signal is for indicating, to the UE, a communication resource for a second reference signal from a higher-layer configuration from the first base station. The second reference signal is associated with a second base station, and the communication resource for the second reference signal is part of the higher-layer configuration. Various examples of such an indication signal are provided elsewhere herein. The higher-layer configuration includes not only a communication resource for a first reference signal associated with the first base station, but also the communication resource for the second reference signal associated with a second base station. At 308, the UE communicates, with the second base station, a data transmission or a control signal transmission using a respective data channel or control channel associated with the communication resource for the second reference signal. Examples of communication resources, reference signals, higher-layer configurations, and channels are also provided herein.

For instance, in some embodiments a reference signal could be an NZP (non-zero power) CSI-RS or a Synchronization Signal (SS) in an SS/PBCH (Physical Broadcast Channel) block. An SS/PBCH block is also referred to as an SS block or SSB. Antenna beams represent one example of a communication resource. Other examples of a communication resource include resources that are differentiated or distinguished from each other by one, or some combination, of time, frequency, code, sequence, antenna port, and layer. Other examples may be or become apparent to those skilled in the art.

Examples of a higher-layer configuration include a configuration that is provided to a UE in RRC signaling, and a beam management module or configuration. More generally, a higher-layer configuration as referenced herein relates to a configuration message carrying some information in the form of so-called information elements (IEs) carrying parameters related to operating in the cellular network, and is provided by network equipment to a UE.

Embodiments could include other operations as well, including any one or more of those shown by way of example in FIG. 3. A method could include receiving 302, by the UE, the higher-layer configuration from the first base station. A method could also or instead involve performing, by the UE, channel measurements for a channel used for communicating a data transmission or a control signal transmission with the first base station, and communicating, by the UE to the first base station, an indication of the channel measurements. This is illustrated at 304. Similar operations in connection with the second base station are shown at 310. As illustrated by 310, a method could also or instead involve performing, by the UE, channel measurements for a channel used for communicating the data transmission or the control signal transmission with the second base station, and communicating, by the UE to the second base station, an indication of the channel measurements.

Operations could also or instead be repeated multiple times. For example, the UE could transition from the second base station to another base station, which could be the first base station or a different base station in a communication network. In this case, the UE could receive an indication signal from the second base station and then communicate with the first base station or the different base station.

Embodiments could include other features, such as any one or more of the following, in any combinations:
the indication signal is or includes Quasi-Colocation (QCL) information;
the indication signal is or includes a Medium Access Control-Control Element (MAC-CE) indication of the communication resource for the second reference signal;
the indication signal is or includes a Downlink Control Information (DCI) indication of the communication resource for the second reference signal;
the indication signal is or includes an RRC indication of the communication resource for the second reference signal;
the higher-layer configuration further includes a communication resource for beam failure recovery.

Figure 4:
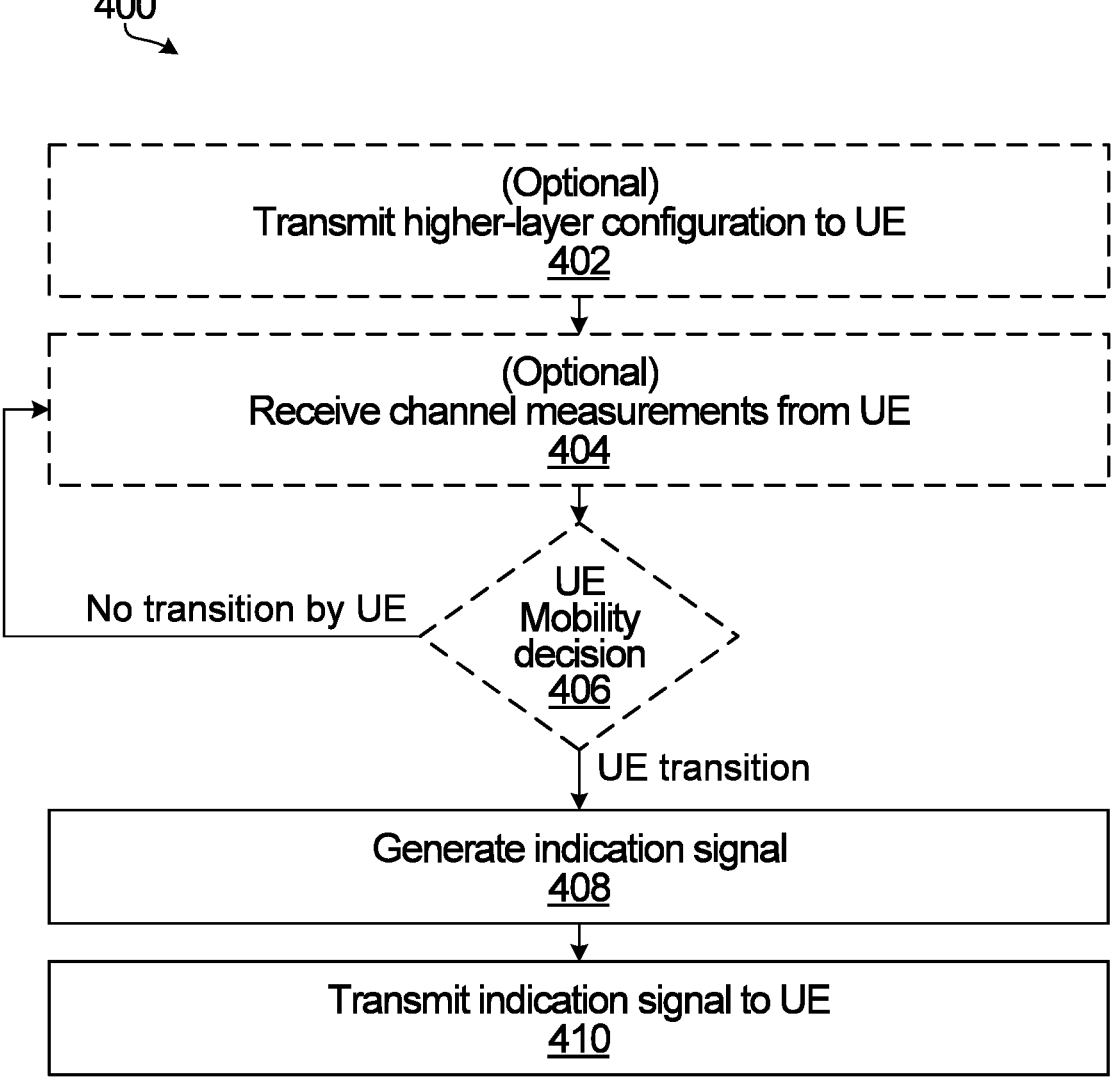
FIG. 4 is a flow diagram illustrating a method according to another embodiment.

FIG. 4 is a flow diagram illustrating a method according to another embodiment. The method 400 is a representative example of a method that could be performed at network equipment such as a base station.

From a network-side perspective, the operations at 408, 410 are of particular relevance to UE mobility. The operation at 408 involves generating an indication signal. The indication signal is generated by a first base station, and is for indicating to a UE a communication resource for a second reference signal. The communication resource for the second reference signal is part of a higher-layer configuration from the first base station to the UE. As noted above with reference to FIG. 3, various examples of such an indication signal are provided elsewhere herein. The higher-layer configuration includes not only a communication resource for a first reference signal associated with the first base station, but also the communication resource for the second reference signal associated with a second base station. At 410, the first base station transmits the indication signal to the UE, to enable the UE to communicate with the second base station, a data transmission or a control signal transmission using a respective data channel or control channel associated with the communication resource for the second reference signal. Examples of communication resources, reference signals, and channels are also provided elsewhere herein.

Embodiments could include other operations as well, including any one or more of those shown by way of example in FIG. 4. A method could include transmitting 402, by the first base station, the higher-layer configuration to the UE. A method could also or instead involve receiving 404, by the first base station from the UE, an indication of channel measurements performed by the UE for a channel used for communicating a data transmission or a control signal transmission with the first base station. UE mobility decisions could be made based at least in part on such channel measurements, as shown at 406, and the indication signal could be generated and transmitted at 408, 410 responsive to a determination that the UE is to transition from the base station to another base station, or possibly even between different resources such as beams associated with the first base station.

Operations could also or instead be repeated multiple times, for different UEs for example.

Embodiments could include other features, such as any one or more of the following, in any combinations:
the indication signal is or includes QCL information;
the indication signal is or includes a MAC-CE indication of the communication resource for the second reference signal;
the indication signal is or includes a DCI indication of the communication resource for the second reference signal;
the indication signal is or includes an RRC indication of the communication resource for the second reference signal;
the higher-layer configuration further includes a communication resource for beam failure recovery.

FIGS. 3 and 4 and the descriptions thereof are illustrative of embodiments. Other embodiments could involve performing additional, fewer, and/or different operations in a similar or different order. The illustrated operations and/or others could be performed in any of various ways. Such variations of these and other embodiments are disclosed herein or may otherwise be or become apparent from the present disclosure. Several detailed examples are also provided below.

Figure 5:
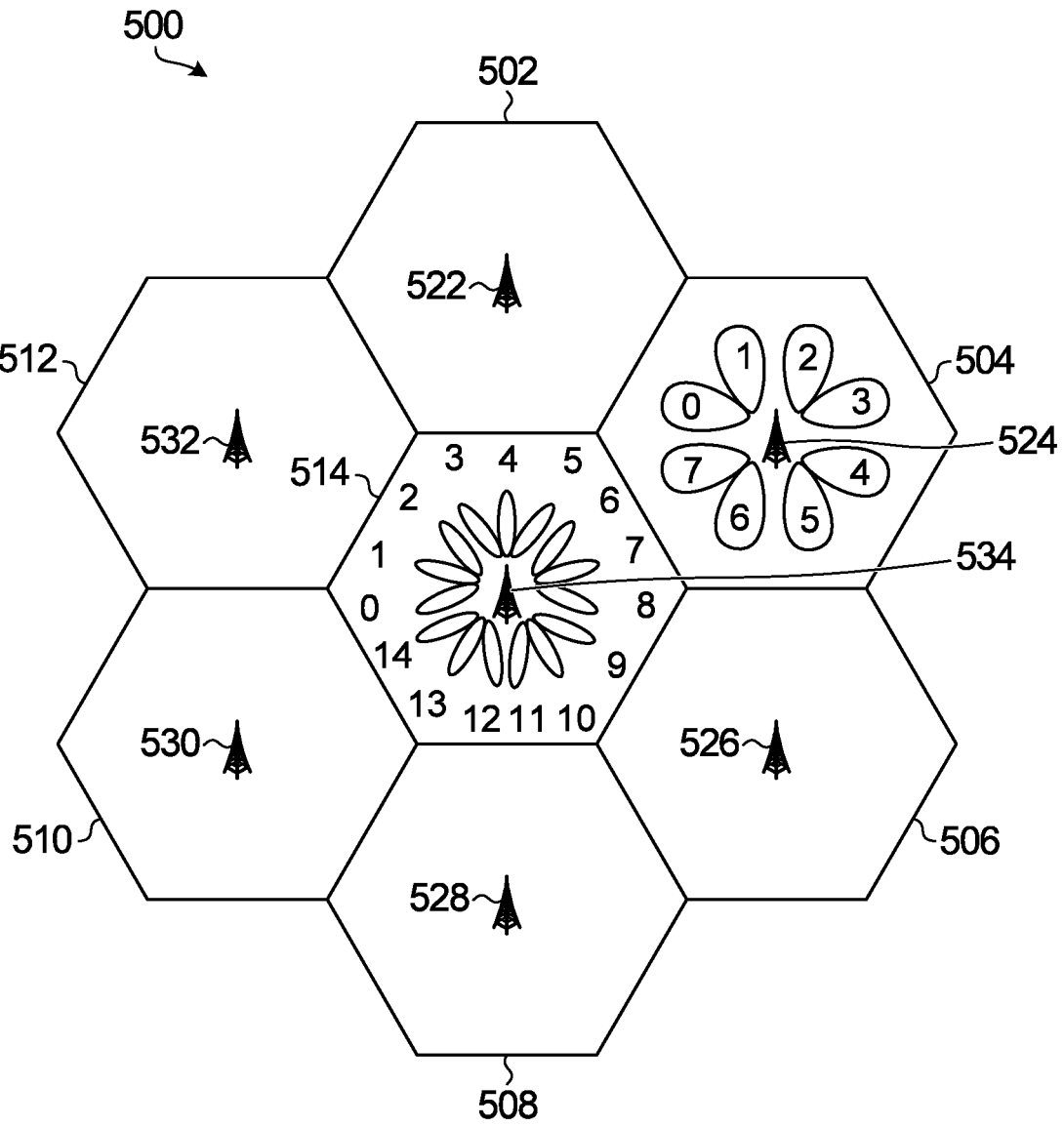
FIG. 5 is a block diagram illustrating coverage areas or cells in a wireless communication network.

Some embodiments enable inter-cell mobility using communication resource management such as beam management. FIG. 5 is a block diagram illustrating coverage areas or cells in a wireless communication network. The example wireless communication network 500 includes base stations 522, 524, 526, 528, 530, 532, 534, providing respective coverage areas or cells 502, 504, 506, 508, 510, 512, 514. Although only one base station per cell is shown in FIG. 5, in other embodiments a cell could include multiple base stations such as multiple TRPs, for example. It should also be appreciated that other features of FIG. 5 could be different in other embodiments. Cells could have different shapes and/or sizes, more or fewer cells could be provided, and/or cells could be arranged in a different pattern than shown, for example.

To provide context for UE mobility through beam management as an illustrative example, antenna beams 0 to 7 and 0 to 14 are shown in FIG. 5 for the base stations 524, 534, respectively. The other base stations 522, 526, 528, 530, 532 could have beam patterns that are similar to or different from those shown. Such features as the number of beams provided by any base station, beam widths, beam directions, and/or beam coverage could be different in other embodiments. Inter-cell mobility herein refers to mobility of a UE between different cells, rather than mobility between beams or network equipment such as TRPs that are part of the same cell.

Figure 6:
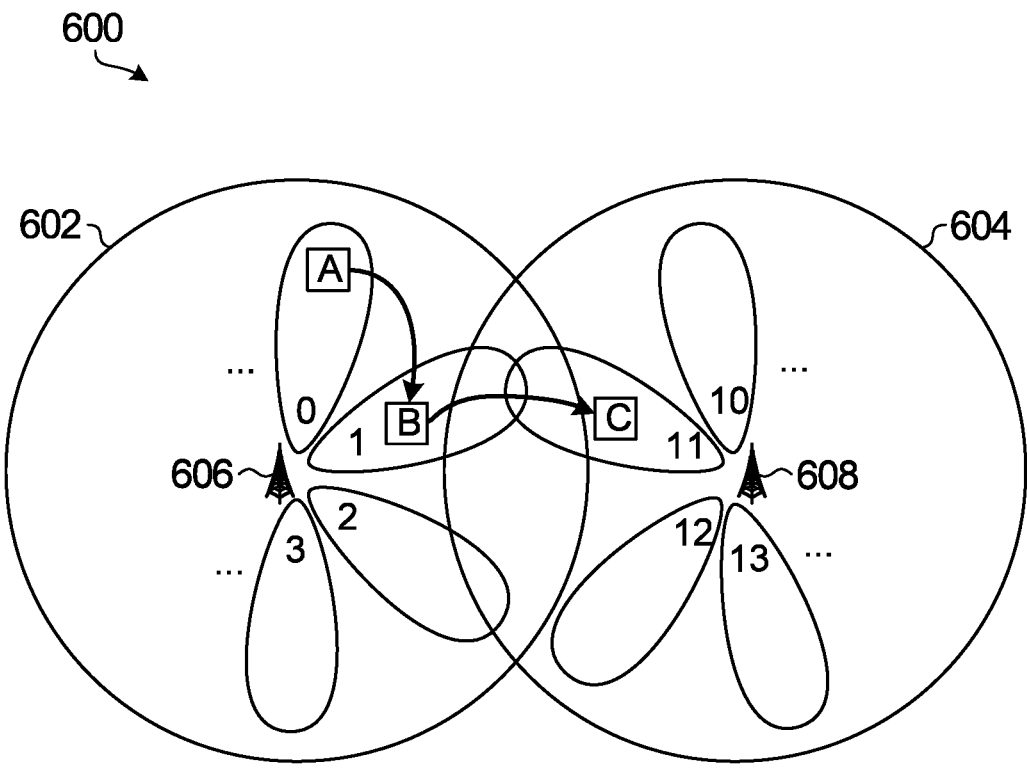
FIG. 6 is a block diagram illustrating two adjacent coverage areas or cells in a wireless communication network.

FIG. 6 is a block diagram illustrating two adjacent coverage areas or cells in a wireless communication network 600. The adjacent cells 602, 604 provided by base stations 606, 608, respectively, could be any two adjacent cells as shown in FIG. 5 or FIG. 2, for example. As noted above for FIG. 5, in other embodiments a cell could include multiple base stations such as multiple TRPs, for example, and other features such as shapes and/or sizes of cells, number of cells, cell pattern, number of beams provided by any base station, beam widths, beam directions, and/or beam coverage could be different in other embodiments.

Four antenna beams 0 to 3 and 10 to 13 are shown in FIG. 6, to illustrate antenna beam identifiers such as beam indices that are unique at least between adjacent cells. Three UE positions A, B, C are also shown. UE mobility between beams 0 and 1 as a UE moves from position A to position B could involve beam management in accordance with NR Release 15. This is an example of intra-cell UE mobility. UE movement from position B to position C is an example of inter-cell UE mobility, and normally involves interrupting UE communications. According to embodiments of the present disclosure, however, inter-cell mobility could involve beam management, for the UE to switch from antenna beam 1 to antenna beam 11, without having to complete a reconfiguration procedure during which UE communications are interrupted.

A beam switching indication or command is an example of an indication signal that could be transmitted to the UE by base station 606 to transition the UE from base station 606 (beam 1) to base station 608 (beam 11). The indication signal could include beam index 11 and/or some other identifier of antenna beam 11 for example. The UE could switch from beam 1 to beam 11 in response to the indication signal, thereby enabling inter-cell mobility between the different cells 602, 604 while avoiding an interruption in UE communications.

To support this type of inter-cell mobility, the base station 606, during initial access by the UE at position A for example, could include information associated with both the base station 606 and the base station 608 in a higher-layer configuration that is signaled or otherwise provided to the UE. For example, such a higher-layer configuration could include not only a communication resource (e.g., beam 0)

for a first reference signal associated with the base station 606, but also a second communication resource (e.g., beam 11) for a second reference signal associated with the base station 608. Information associated with other adjacent neighboring base stations of the base station 606 could also be included in the higher-layer configuration. The UE then has the information it needs when moving from one cell to a neighboring cell.

Other configurations and/or UE mobility between other cells could be handled in a similar manner. After the UE has moved to position C, for example, the base station 608 could provide to the UE information associated with neighbors of the base station 608, or possibly only neighbors other than the base station 606, for which the UE already has configuration information. More generally, a base station in a target cell into which a UE moves could provide neighboring base station or cell information to a UE for all neighboring base stations or cells of the target base station or cell, with the possible exception of the previous serving cell or base station or any other neighboring base stations or cells for which the UE already has configuration information. In some embodiments, information for all neighbors could be provided to a UE, and the UE could ignore information for any neighbors for which it already has information.

It should be appreciated, however, that there could be cases with updates to a UE's higher-layer configuration, and other cases with no such updates.

Figure 7:
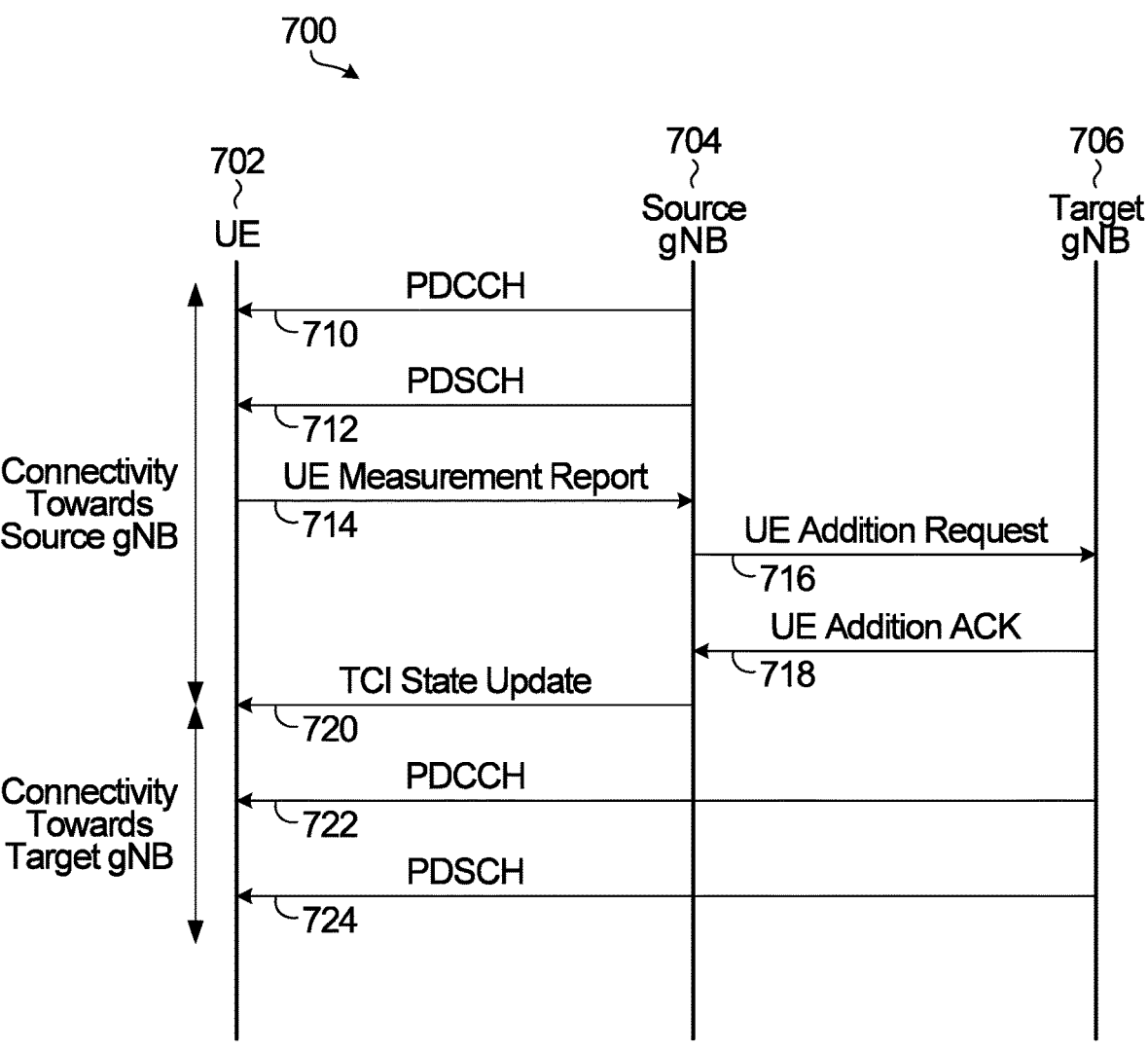
FIG. 7 is a signaling diagram illustrating inter-cell mobility signaling according to an embodiment.

FIG. 7 is a signaling diagram illustrating inter-cell mobility signaling according to an embodiment. FIG. 7 relates to an example 700 in which a UE 702 transitions from a serving cell or source cell that is serviced by a source gNB 704 to a target a target cell that is serviced by a target gNB 706. In FIG. 7, it is presumed that initial access and configuration has already been completed.

Operations 710, 712 represent downlink communication between the UE 702 and the source gNB 704. Data transmission 712 and control signal transmission 710 from the source gNB 704 to the UE 702 use respective data channel and control channel, shown by way of example as a Physical Downlink Shared Channel (PDSCH) and a Physical Downlink Control Channel (PDCCH). These channels are associated with reference signals that are in turn associated with the source gNB 704.

The UE 702 performs physical layer (layer 1 or "L1") channel measurements, examples of which are disclosed elsewhere herein, and provides an L1 measurement report to the source gNB 704 at operation 714. Based on the channel measurements, the source gNB determines whether the UE 702 should be transitioned to the target gNB 706. For example, the source gNB 704 could determine whether the UE 702 should be transitioned to the target gNB 706 by comparing channel measurements to one or more thresholds, and making a determination based on whether the channel measurements are above or below the threshold(s).

At operations 716, 718, FIG. 7 shows an example of signaling between the gNBs 704, 706, so that the target gNB 706 is ready to take on the UE 702. A TCI State update as shown at 720 references a communication resource of the target gNB 706, and is an example of an indication signal that is also described elsewhere herein.

After the TCI State update at operation 720, the UE 702 communicates, with the target gNB 706, a data transmission and a control signal transmission using the respective data channel (PDSCH) and control channel (PDCCH), at operations 722, 724. The PDSCH and PDCCH at 722, 724 are associated with reference signals that are in turn associated with the target gNB 706. UE mobility in FIG. 7 involves only a TCI State update at operation 720, rather than a reconfiguration during which UE communications are interrupted.

Figure 8:
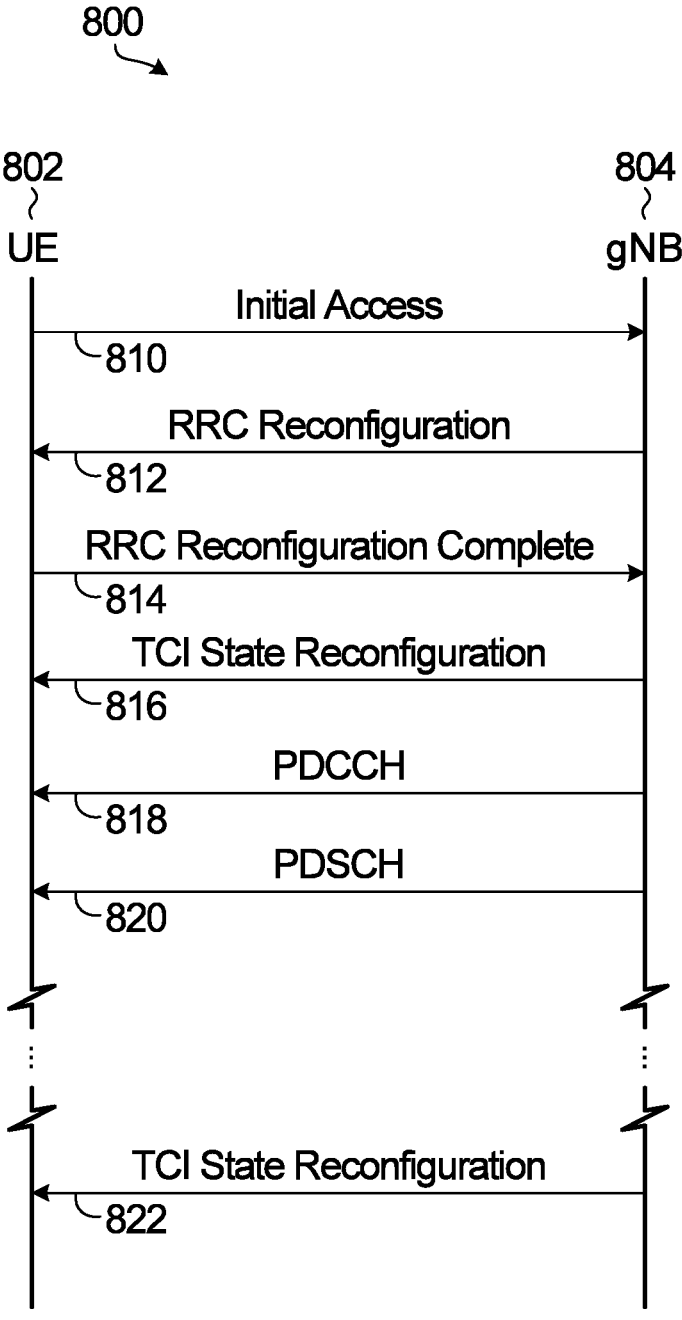
FIG. 8 is a signaling diagram illustrating an example of higher-layer configuration signaling and inter-cell mobility signaling in accordance with some embodiments.

FIG. 8 is a signaling diagram illustrating an example of higher-layer configuration signaling and inter-cell mobility signaling in accordance with some embodiments. In the example 800, a UE 802 initiates an access procedure at operation 810. The gNB 804 responds with an RRC Reconfiguration message at 812. The RRC Reconfiguration message, however, includes not only information associated with the gNB 804 itself, but also information associated with one or more neighboring gNBs. For example, the RRC Reconfiguration message could be considered a form of a higher-layer configuration received by the UE 802 from the gNB 804, including a communication resource for a first reference signal associated with the gNB and a communication resource for a second reference signal associated with a different gNB.

The following is an example of an RRC Reconfiguration Information Element (IE) that could be sent from the gNB 804 to the UE 802 at operation 812 to provide the UE with a higher-layer configuration that includes information for both the gNB 804 and at least one other gNB:

```
RRCReconfiguration-IEs ::=     {
    radioBearerConfig          RadioBearerConfig
    . . .
    beamManagementConfig       BeamManagementConfig
    . . .
}
```

The UE 802 copies information from the higher-layer configuration into one or more memory devices, and sends an RRC Reconfiguration Complete message to the gNB 804 at operation 814. In some embodiments, one or more internal UE variables are used to store such information in UE memory, and examples of such variables are provided elsewhere herein.

In a TCI State Activation message at operation 816, the gNB 804 informs the UE 802 as to which TCI states the UE should track. This could be in a MAC-CE command or indication, a DCI command or indication, or an RRC command or indication, for example. After TCI state activation, the UE 802 communicates with the gNB 804 using control and data channels PDCCH and PDSCH, at operations 818, 820. At some later time, a new TCI State Activation message, to transition the UE 802 to different resources such as different beams of the gNB 804, or to another gNB in a different cell, is sent from the gNB 804 to the UE 802 at operation 822. In response to the new TCI State Activation message at 822 the UE 802 performs beam switching. The TCI State Activation message at operation 822 is an example of an indication signal as referenced elsewhere herein.

Figure 9:
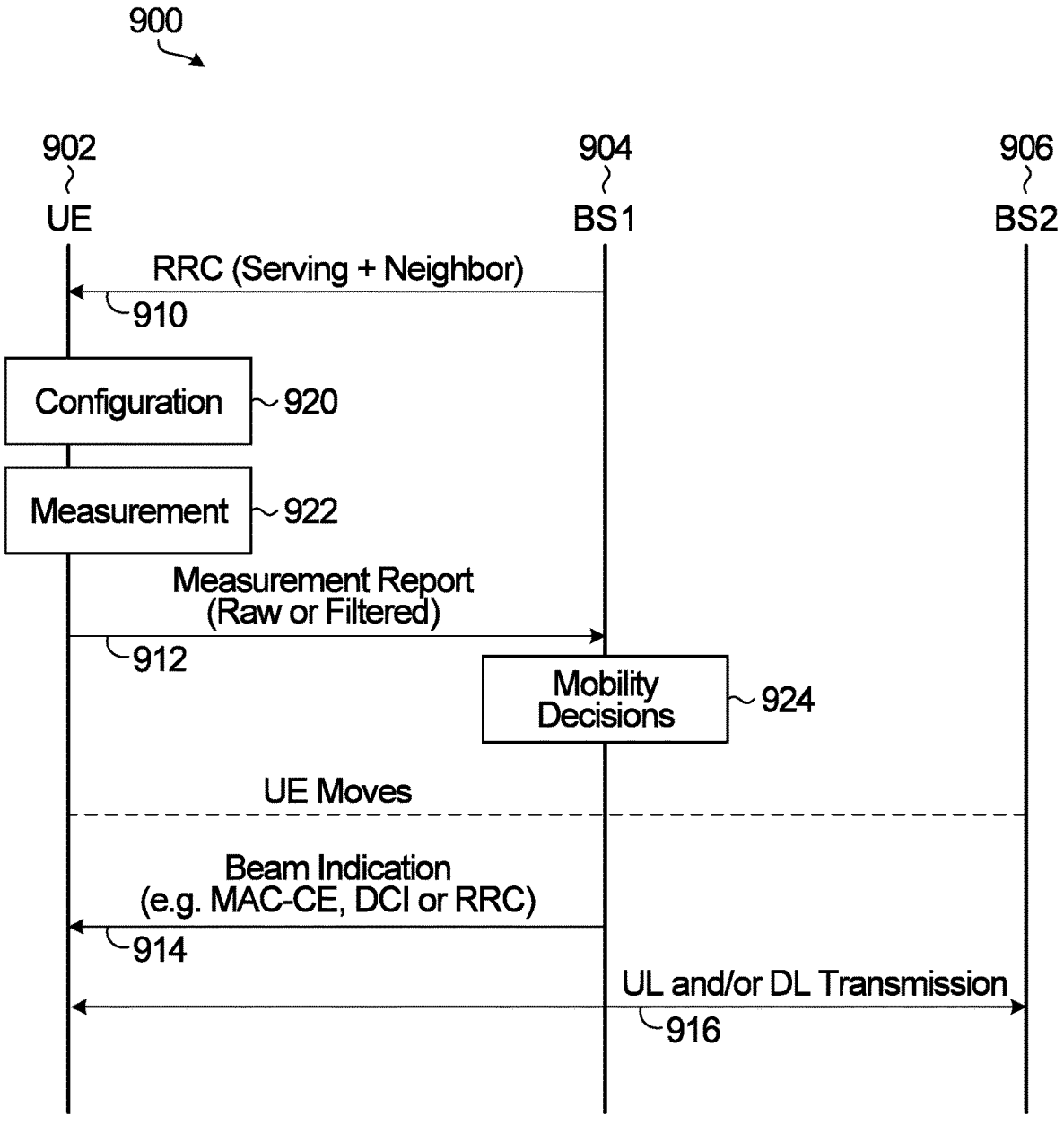
FIG. 9 is a signaling diagram illustrating another example of higher-layer configuration signaling and inter-cell mobility signaling.

FIG. 9 is a signaling diagram illustrating another example of higher-layer configuration signaling and inter-cell mobility signaling. In the example 900, a UE 902 receives a higher-layer configuration from a BS1 904 in RRC signaling 910 that includes information associated with the serving base station BS1 904 and information associated with a neighboring base station BS2 906. Configuration and channel measurement are represented at operations 920, 922, respectively, and a measurement report is transmitted by the UE 902 to the serving base station BS1 904 at operation 912. The measurement report could be raw or filtered.

Communications between the UE 902 and the serving base station BS1 904 could be ongoing, but are not shown in FIG. 9 in order to avoid congestion in the drawing.

As the UE moves, represented by the dashed line in FIG. 9, mobility decisions are made by the serving base station BS1 904, as shown at operation 924. If the serving base station BS1 904 determines that the UE 902 should be transitioned to a different communication resource, in particular an antenna beam in the example shown in FIG. 9, then an indication signal in the form of a beam indication at operation 914 is transmitted to the UE by the base station. A beam indication could be in a MAC-CE command or indication, a DCI command or indication, or an RRC command or indication, for example. The UE 902 performs beam switching in accordance with the beam indication, and then communicates with a base station using the new beam. Communications at operation 916 after beam switching could be with the same serving base station BS1 904 or another base station in the same cell for intra-cell mobility, but for illustrative purposes the base station BS2 906 is intended to represent a base station that provides service in a different cell.

Although not shown in FIG. 9, the serving base station BS1 904 could exchange message with the base station BS2 906 to prepare the base station BS2 906 to take over the UE 902. An example of this is shown in FIG. 7.

FIG. 9 also illustrates that communications could involve uplink (UL) and/or downlink (DL) transmissions. Examples herein refer primarily to DL communications from a base station to a UE, but embodiments could also or instead be applied to UL communications.

Aspects of a universal QCL framework and inter-cell beam management are referenced herein, and will now be discussed by way of further detailed examples. In this application, "universal" is intended to mean that the QCL framework is intended to operate for source and neighbor cells, or equivalently for serving and non-serving cells.

With regard first to universal QCL framework, it is noted that in NR Release 15, TCI state tables are maintained with PDSCH configuration objects. PDSCH-Config are defined for given serving cells and BWPs as shown below:

```
-- ASN1START
-- TAG-PDSCH-CONFIG-START
PDSCH-Config::= SEQUENCE {
    dataScramblingIdentityPDSCH      INTEGER (0..1023)      OPTIONAL, --
Need S
    dmrs-DownlinkForPDSCH-MappingTypeA      SetupRelease{DMRS-
DownlinkConfig}        OPTIONAL, -- Need M
    dmrs-DownlinkForPDSCH-MappingTypeB      SetupRelease{DMRS-
DownlinkConfig}        OPTIONAL, -- Need M
```

-continued

```
tci-StatesToAddModList          SEQUENCE(SIZE(1..MaxNrofTCI-States))
OF TCI-State          OPTIONAL, -- Need N
    tci-StatesToReleaseList          SEQUENCE(SIZE(1..MaxNrofTCI-States))
OF TCI-StateId          OPTIONAL, -- Need N
    ...
}
-- TAG-PDSCH-CONFIG-STOP
-- ASN1STOP
```

The above object is an RRC IE used to configure parameters for a UE to receive a channel, such as a PDSCH. The item in bold and underline formatting includes a list of QCL assumptions. This configuration is currently for a serving cell, and therefore requires reconfiguration when an UE moves to a different cell.

Optional fields in an RRC IE can be provided with tags specifying the UE behaviour with respective to a given field's presence or absence when the UE receives a higher-layer signaling message with that RRC IE. "Need S" means that the UE behaviour is specified if the field is absent. "Need M" means that the UE behaviour is to maintain its current value if the field is absent. "Need N" means that the UE behaviour is to take no action if the field is absent. "Need R", which is not in the above example but appears below, means that the UE behaviour is to release the current value if the field is absent.

condition tag associated to a field, then "Cond condition Tag" means that the presence of the field is conditional on conditionTag being verified. "CondC condition Tag" means that the presence of the field is conditional to the setting given by conditionTag. "CondM condition Tag" means that the presence of the field is conditional to the field conditionTag being included in the message.

According to some embodiments, a variable for the UE to maintain a TCI-state list/QCL assumptions separately from cell-specific configuration is introduced. For example, RRC objects could reference an entry in a TCI-state list maintained by the UE, as shown below, in which an example of a new variable is highlighted in bold and underline:

```
-- ASN1START
-- TAG-VAR-TCI-STATE-START
VarTciStateConfig::=    SEQUENCE{
    .  --TCI state list
    Tci-StatesToAddModList          SEQUENCE(SIZE(1..maxNrofTCI-States))
OF TCI-State          OPTIONAL,
}
TCI-State::= SEQUENCE {
    tci-StateId INTEGER(0..maxNrofTCI-States-1),
    qcl-Type1 QCL-Info,
    qcl-Type2 QCL-Info,
    ...
}
QCL-Info::= SEQUENCE {
    cell          ServCellIndex,
    bwp-Id     BWP-Id,
    referencesignal          CHOICE {
        csi-rs     NZP-CSI-RS-ResourceId,
        ssb                SSBIndex
    },
    qcl-Type     ENUMERATED{typeA, typeB, typeC, typeD}
    ...
}
-- TAG-VAR-TCI-STATE-STOP
-- ASN1STOP
```

Fields in an RRC IE can be provided with conditional tags which predicate the presence of a given field on a certain condition to be verified. For example, if conditionTag is the The following provides another example of an RRC procedure for TCI state list configuration, with an example new item highlighted in bold and underline:

```
-- ASN1START
-- TAG-RRCRECONFIGURATION-START
    RRCReconfiguration-IEs::=          SEQUENCE{
    radioBearerConfig          RadioBearerConfig          OPTIONAL, -- Need M
    secondaryCellGroup          OCTET STRING (CONTAINING CellGroupConfig)
        OPTIONAL, -- Need M
    measConfig                          MeasConfig OPTIONAL, -- Need M
    tci-StateConfigTciStateConfigOPTIONAL, --
    Need N
```

-continued

```
lateNonCriticalExtension    OCTET STRING          OPTIONAL,
nonCriticalExtension        RRCReconfiguration-v1530-IEs      OPTIONAL
}
-- TAG-RRCRECONFIGURATION-STOP
-- ASN1STOP
```

The following procedure is applied by network equipment in an embodiment:

to ensure that, whenever the UE has a PDSCH-Config, it includes a tci-StateId for the PDSCH transmission to be received;

to ensure that, whenever the UE has a ControlResource-Set, it includes a tci-StateId for the PDCCH transmission to be received;

The UE applies the following procedure, in an embodiment:

1> for each tci-StateId included in the received tci-StateToAddModList:

2> if an entry with the matching tci-StateId exists in the tci-StateToAddModList within the VarTciStateConfig, for this entry:

3> reconfigure the entry with the value received for this TCI-State;

2> else:

3> add a new entry for the received TCI-State to the tci-StateToAddModList within VarTciStateConfig.

In some embodiments, a variable for the UE to maintain a TCI-state list separately is introduced, and RRC objects reference an entry in the TCI state list maintained by the UE. See TCI-StateId in the item highlighted by bold and underline below:

```
-- ASN1START
-- TAG-PDSCH-CONFIG-START
PDSCH-Config::= SEQUENCE {
    dataScramblingIdentityPDSCH           INTEGER (0..1023)        OPTIONAL, --
Need S
    dmrs-DownlinkForPDSCH-MappingTypeA            SetupRelease{DMRS-
DownlinkConfig}        OPTIONAL, -- Need M
    dmrs-DownlinkForPDSCH-MappingTypeB            SetupRelease{DMRS-
DownlinkConfig}        OPTIONAL, -- Need M
    tci-StatesToAddModList        SEQUENCE(SIZE(1..MaxNrofTCI-States))
OF TCI-StateId        OPTIONAL, – Need N
    tci-StatesToReleaseList SEQUENCE(SIZE(1..MaxNrofTCI-States)) OF TCI-
StateId        OPTIONAL, -- Need N
}
    ...
-- TAG-PDSCH-CONFIG-STOP
-- ASN1STOP
```

TCI-StateId is an identifier of a Transmission Configuration Indicator state. A TCI state is an IE that associates a downlink reference signal with a QCL assumption (e.g. delay spread, average delay, Doppler spread, Doppler shift, Spatial Rx filter). The TCI-StateId is used to uniquely identify a given downlink reference signal and a set of one or more QCL assumptions. When a UE is provided with a TCI-StateId in the PDSCH-Config, the UE can assume that for any PDSCH DMRSs transmitted as part of the PDSCH transmission, the UE can perform channel estimation based on the QCL assumptions it derived from the downlink reference signal indicated in the TCI-State identified by TCI-StateId.

Inter-cell beam management could involve "cell-transparent" beam switching, in which a UE switches between beams that are associated with different cells, without first completing RRC reconfiguration and experiencing an interruption in communications.

In NR Release 15, QCL information supplies a reference to the corresponding serving cell configuration. If QCL information is based on SSBs, then it includes a reference to the serving cell configuration. If QCL information is based on CSI-RSs, then there is no need for physical cell identity. An example of QCL information is provided below, and includes a physical cell identity in the form of a serving cell index, which is highlighted in bold and underline below:

```
-- ASN1START
-- TAG-VAR-TCI-STATE-START
VarTciStateConfig::=         SEQUENCE {
    --TCI state list
    tci-StatesToAddModList SEQUENCE (SIZE(1..maxNrofTCI-States)) OF TCI-State
OPTIONAL, -- Need N
}
TCI-State:: = SEQUENCE {
    tci-StateId INTEGER(0..maxNrotTCI-States-1),
    qcl-Type1 QCL-Info,
    qcl-Type2 QCL-Info,
    ...
}
QCL-Info::= SEQUENCE {
    cell        ServCellIndex,
    bwp-Id BWP-Id,
    referencesignal         CHOICE {
        csi-rs                              NZP-CSI-RS-ResourceId,
        ssb                         SSBIndex
    },
    qcl-Type    ENUMERATED{typeA, typeB, typeC, typeD}
}
-- TAG-VAR-TCI-STATE-STOP
-- ASN1STOP
```

According to some embodiments, if QCL information is based on SSBs, then the physical cell identity and ssbFrequency are included for unique identification, and if QCL information is based on CSI-RSs then there is no need for physical cell identity. An example is shown below. See in particular the elements highlighted in bold and underline below:

```
-- ASN1START
-- TAG-VAR-TCI-STATE-START
VarTciStateConfig::=         SEQUENCE {
    --TCI state list
    tci-StatesToAddModList SEQUENCE (SIZE(1..maxNrofTCI-States)) OF TCI-State
        OPTIONAL, -- Need N
}
TCI-State::= SEQUENCE {
    tci-StateId INTEGER(0..maxNrotTCI-States-1),
    qcl-Type1 QCL-Info,
    qcl-Type2 QCL-Info,
    ...
}
QCL-Info::= SEQUENCE {
    bwp-Id    BWP-Id,
    referencesignal         CHOICE {
        csi-rs                      NZP-CSI-RS-ResourceId,
        ssb                     SSB-Resource
    },
    qcl-Type ENUMERATED{typeA, typeB, typeC, typeD}
    ...
}
```

-continued

```
SSB-Resource::=          SEQUENCE {
 ssb-Index  SSB-Index,
 cellId                   PhysCellId,
 ssbFrequency             ARFCN-ValueNR
}
-- TAG-VAR-TCI-STATE-STOP
-- ASN1STOP
```

In some embodiments, a Serving cell ID field in TCI State activation/deactivation for UE-specific PDSCH MAC-CE command is no longer required. The following is an example:

| R | R | R | R | R | R | | BWP ID |
|---|---|---|---|---|---|---|---|
| TCI 7 | TCI 6 | TCI 5 | TCI 4 | TCI 3 | TCI 2 | TCI 1 | TCI 0 |
| | | | ... | | | | |
| TCI N-1 | TCI N-2 | TCI N-3 | TCI N-4 | TCI N-5 | TCI N-6 | TCI N-7 | TCI N-8 |

In the above example, each TCI field could have a value of 0 or 1 to indicate to a UE which TCI states the UE should track. A value of 1 could indicate an active TCI state, for example, although other active/inactive indication or designation values could be used. The UE does not need to distinguish between or be aware of whether reference signals are associated with a serving/source cell or a neighbor/target cell.

For large values of the number of TCI states N (e.g., N>256), TCI-State Group activation for a UE-specific PDSCH MAC-CE command could include, for example, TCI group size: Maximum Number of TCI states in group, TCI group start: Maximum Number of TCI states/TCI group size, and TCI-state ID i=TCI group start*TCI group size+n, as in the following example:

| | TCI group start | | BWP ID |
|---|---|---|---|
| TCI group size | | TCI group start | |
| TCI (i + TCI group size – 1) | ... | TCI (i + 2)  TCI (i + 1) | TCI i |

A TCI-state whose ID is outside the TCI-state group activation would be TCI-state inactive. In an embodiment, for a TCI-state whose ID is inside the TCI-state group activation, the TCI-state is active if the corresponding TCI field ("TCI (i+x)" in the above example) is set to 1, and the TCI-state is inactive if the corresponding TCI field is set to 0. Other active/inactive indication or designation values could be used.

Figure 10:
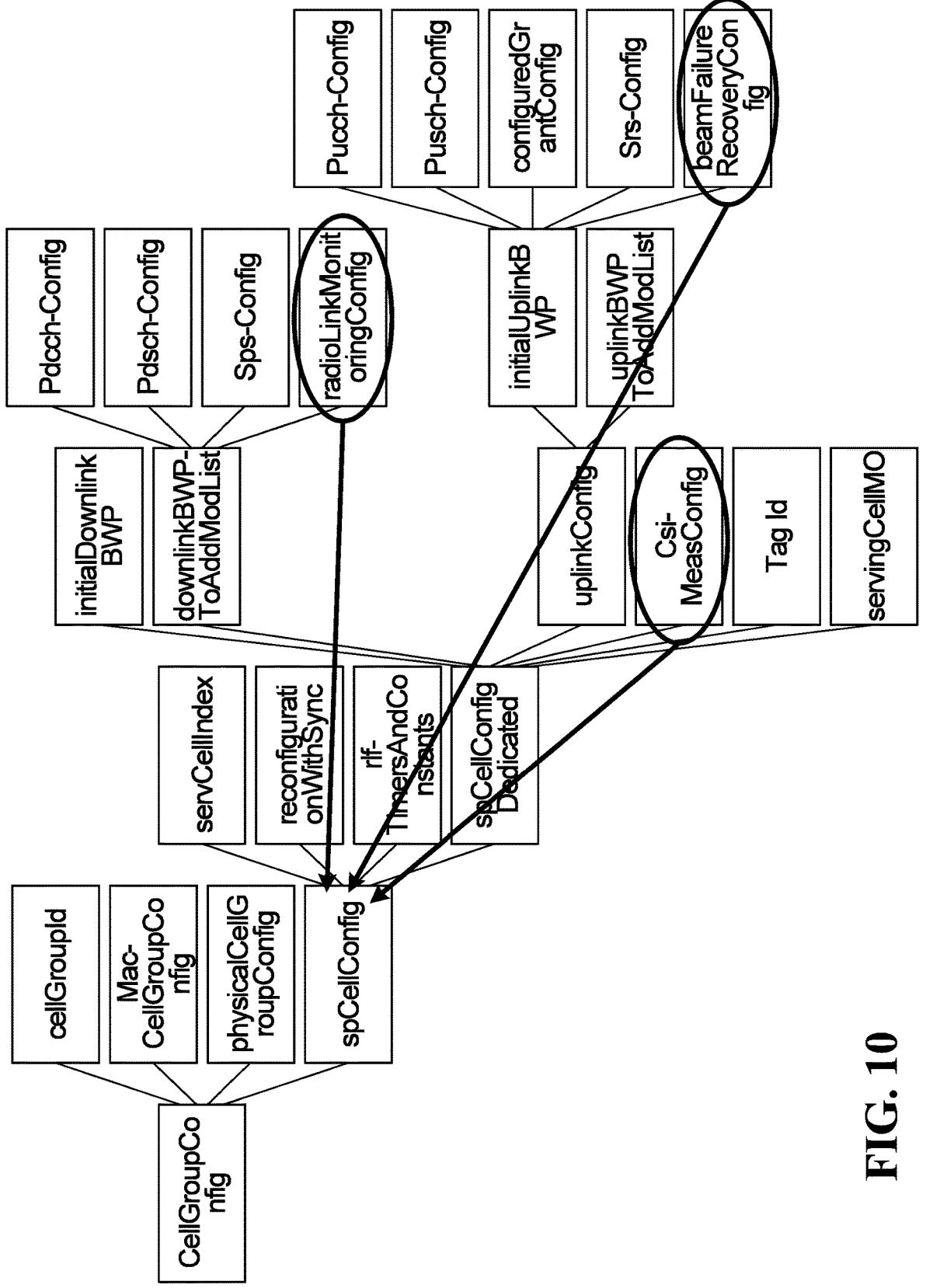
FIG. 10 is a block diagram illustrating an example serving cell configuration stored at a UE.

As noted elsewhere herein, in NR Release 15 beam management is a function performed within a cell. Beam Failure Detection and Beam Failure Recovery are defined for a given serving cell configuration, and resources used for beam management are defined in Csi-MeasConfig. FIG. 10 is a block diagram illustrating an example serving cell configuration stored at a UE. In FIG. 10, the circled elements represent resources used for beam management.

In accordance with some embodiments, beam management resource definitions are moved outside of, or "externalized" from, serving cell configuration. An example is shown below, in which elements in bold and italic are to be moved outside of service cell configuration, to provide resource configurations that need not change based on UE mobility between different cells.

```
-- ASN1START
-- TAG-CSI-MEAS-CONFIG-START
CSI-MeasConfig::= SEQUENCE {
    nzp-CSI-ResourceToAddModListSEQUENCE(SIZE(1..MaxNrofNZP-CSI-RS-
    Resources)) OF NZP-CSI-RS-Resource OPTIONAL, – Need N
    nzp-CSI-RS-ResourceToReleaseList SEQUENCE(SIZE(1..MaxNrofNZP-CSI-RS-
    Resources)) OF NZP-CSI-RS-ResourceId OPTIONAL,  -- Need N
    nzp-CSI-RS-ResourceSetToAddModList SEQUENCE(SIZE(1..MaxNrofNZP-
    CSI-RS-ResourceSets))OF NZP-CSI-RS-ResourceOPTIONAL, – Need N
    nzp-CSI-RS-ResourceSetToReleaseList SEQUENCE(SIZE(1..MaxNrofNZP-CSI-
    RS-ResourceSets)) OF NZP-CSI-RS-ResourceSetId OPTIONAL,  -- Need N
    csi-IM-ResourceToAddModList SEQUENCE(SIZE(1..MaxNrofCSI-IM-Resources))
    OF CSI-IM-Resource OPTIONAL,  -- Need N
    csi-IM-ResourceToReleaseList SEQUENCE(SIZE(1..MaxNrofCSI-IM-Resources))
    OF CSI-IM-ResourceId OPTIONAL,  -- Need N
    csi-IM-ResourceSetToAddModList SEQUENCE(SIZE(1..MaxNrofCSI-IM-
    ResourceSets)) OF CSI-IM-ResourceSet OPTIONAL,  -- Need N
    csi-IM-ResourceSetToReleaseList SEQUENCE(SIZE(1..MaxNrofCSI-IM-
    ResourceSets)) OF CSI-IM-ResourceSetId OPTIONAL,  -- Need N
    csi-SSB-ResourceSetToAddModList SEQUENCE(SIZE(1..MaxNrofCSI-SSB-
    ResourceSets)) OF CSI-SSB-ResourceSetOPTIONAL, – Need N
    csi-SSB-ResourceSetToReleaseList SEQUENCE(SIZE(1..MaxNrofCSI-SSB-
    ResourceSets)) OF CSI-SSB-ResourceSetId OPTIONAL,  -- Need N
    csi-ResourceConfigToAddModList SEQUENCE(SIZE(1..MaxNrofCSI-
    ResourceConfigurations)) OF CSI-ResourceConfig OPTIONAL,  -- Need N
    csi-ResourceConfigToReleaseList SEQUENCE(SIZE(1..MaxNrofCSI-
    ResourceConfigurations)) OF CSI-ResourceConfigId OPTIONAL,  -- Need N
    csi-ReportConfigToAddModList SEQUENCE(SIZE(1..MaxNrofCSI-
    ReportConfigurations)) OF CSI-ReportConfig OPTIONAL,  -- Need N
    csi-ReportConfigToReleaseList SEQUENCE(SIZE(1..MaxNrofCSI-
```

```
   Reportconfigurations)) OF CSI-ReportConfigId OPTIONAL, -- Need N
    reportTriggerSize INTEGER (0..6) OPTIONAL, -- Need M
    aperiodicTriggerStateList SetupRelease{CSI-AperiodicTriggerStateList}
   OPTIONAL, -- Need M
    semiPersistentOnPUSCH-TriggerStateList SetupRelease{CSI-
   SemiPersistentOnPUSCH-TriggerStateList} OPTIONAL, -- Need M
    ...
   }
   -- TAG-CSI-MEAS-CONFIG-STOP
   -- ASN1STOP
```

An example in which beam management resource definitions are moved out of serving cell configuration is shown below, with a new variable and a new field highlighted in bold and underline. The bold and underlined line under NZP-CSI-RS-Resource below highlights a field that could be added to specify information that may be needed as a result of moving the resource definitions out of serving cell configuration.

```
-- ASN1START
-- TAG-VAR=BEAM-MANAGEMENT-CONFIG-START
VarBeamManagementConfig::=SEQUENCE {
 --NZP CSI-RS resources
 beamManagementCsirsResourcesToAddModList
SEQUENCE(SIZE(1..maxNrofNZP-CSI-RS-Resources)) OF NZP-CSI-RS-
Resource OPTIONAL,
  --NZP CSI-RS resource sets
 beamManagementCsirsResourceSetToAddModList
SEQUENCE(SIZE(1..maxNrofNZP-CSI-RS-ResourceSets)) OF NZP-CSI-RS-
ResourceSet OPTIONAL,
  --CSI-SSB resource sets
 beamManagementCsissbResourceSetToAddModList
SEQUENCE(SIZE(1..maxNrofCSI-SSB-ResourceSets)) OF CSI-SSB-ResourceSet
OPTIONAL
}
-- TAG-VAR-BEAM-MANAGEMENT-CONFIG-STOP
-- ASN1STOP
-- ASN1START
-- TAG-NZP-CSI-RS-RESOURCE-START
NZP-CSI-RS-Resource::= SEQUENCE {
 nzp-CSI-RS-ResourceId NZP-CSI-RS-ResourceId,
 absoluteFrequencyCSI-RS ARFCN-ValueNR,
 resourceMapping CSI-RS-ResourceMapping,
 powerControlOffset INTEGER (-8..15),
 powerControlOffsetSS ENUMERATED {db-3, db0, db3, db6} OPTIONAL, -- Need
R
 scramblingID ScramblingId,
 periodicityAndOffset CSI-ResourcePeriodicityAndOffset OPTIONAL, -- Cond
PeriodicOrSemiPersistent
 qcl-InfoPeriodicCSI-RS TCI-StateId OPTIONAL, -- Cond Periodic
 ...
}
-- TAG-NZP-CSI-RS-RESOURCE-STOP
-- ASN1STOP
```

Source/Neighbour cell reference resources could be maintained in a separate list by a UE. Network equipment could configure UE with a given set of resources (e.g. SSB/CSI-RS), for example.

An example RRC IE and procedure that could be used if an RRC Reconfiguration message carries a beamManagementConfig object are shown below, and cause a UE to copy content to a variable varBeamManagementConfig, referenced in an example above. See in particular the elements in bold and underline.

```
-- ASN1START
-- TAG-RRCRECONFIGURATION-START
RRCReconfiguration-IEs: SEQUENCE {
 radioBearerConfig RadioBearerConfig OPTIONAL, -- Need M
 secondaryCellGroup OCTET STRING (CONTAINING CellGroupConfig)
OPTIONAL, -- Need M
 measConfig MeasConfig OPTIONAL, -- Need M
 beamManagementConfig BeamManagementConfig OPTIONAL, -- Need N
 lateNonCriticalExtension OCTET STRING OPTIONAL,
 nonCriticalExtension RRCReconfiguration-v1530-IEs
}
BeamManagementConfig::= SEQUENCE {
 --NZP CSI-RS resources
 beamManagementCsirsResourcesToAddModList
SEQUENCE(SIZE(1..maxNrofNZP-CSI-RS-Resources)) OF NZP-CSI-RS-
Resource OPTIONAL,
 --NZP CSI-RS resource sets
 beamManagementCsirsResourceSetToAddModList
SEQUENCE(SIZE(1..maxNrofNZP-CSI-RS-ResourceSets)) OF NZP-CSI-RS-
ResourceSet OPTIONAL,
 --CSI-SSB resource sets
 beamManagementCsissbResourceSetToAddModList
SEQUENCE(SIZE(1..maxNrofCSI-SSB-ResourceSets)) OF CSI-SSB-ResourceSet
OPTIONAL
}
-- TAG-RRCRECONFIGURATION-STOP
-- ASN1STOP
```

According to procedure in some embodiments, a UE shall:

1> for each nzp-CSI-RS-ResourceId included in the received beamManagementCsirsResourcesToAdd-ModList:

2> if an entry with the matching nzp-CSI-RS-ResourceId exists in the beamManagementCsirsResourcesToAddModList within the VarBeamManagementConfig, for this entry:

3> reconfigure the entry with the value received for this bnzp-CSI-RS-ResourceId;

2> else:

3> add a new entry for the received nzp-CSI-RS-ResourceId to the beamManagementCsirsResourcesToAddModList within VarBeamManagementConfig.

In some embodiments, a UE shall:

1> for each nzp-CSI-RS-ResourceSetId included in the received beamManagementCsirsResourceSetToAddModList:

2> if an entry with the matching nzp-CSI-RS-ResourceSetId exists in the beamManagementCsirsResourceSetToAddModList within the VarBeamManagementConfig, for this entry:

3> reconfigure the entry with the value received for this nzp-CSI-RS-ResourceSetId;

2> else:

3> add a new entry for the received nzp-CSI-RS-ResourceSetId to the beam ManagementCsirsResourceSetToAddModList within VarBeamManagementConfig.

A UE shall, in some embodiments:

1> for each csi-SSB-ResourceSetId included in the received beamManagementCsissbResourceSetToAddModList:

2> if an entry with the matching csi-SSB-ResourceSetId exists in the beamManagementCsissbResourceSetToAddModList within the VarBeamManagementConfig, for this entry:

3> reconfigure the entry with the value received for this csi-SSB-ResourceSetId;

2> else:

3> add a new entry for the received csi-SSB-ResourceSetId to the beamManagementCsissbResourceSetToAddModList within VarBeamManagementConfig.

Some embodiments could involve moving candidate beam resource definitions out of serving cell configuration for Beam Failure Recovery. This could be implemented in combination with or independently from other features disclosed herein. Shown below, in bold and italic, are examples of definitions that could be moved out of serving cell configuration.

```
-- ASN1START
-- TAG-BEAM-FAILURE-RECOVERY-CONFIG-START
BeamFailureRecoveryConfig::= SEQUENCE {
 rootSequenceIndex-BFR INTEGER (0..137) OPTIONAL, -- Need M
 rach-ConfigBFR RACH-ConfigGeneric OPTIONAL, -- Need M
 rsrp-ThresholdSSB RSRP-Range OPTIONAL, -- Need M
 candidateBeamRSList SEQUENCE(SIZE(1..maxNrofCandidateBeams)) OF
 PRACH-ResourceDedicatedBFR OPTIONAL, - Need M
 ssb-perRACH-Occasion ENUMERATED{oneEighth, oneFourth, oneHalf, one, two,
four, eight, sixteen} OPTIONAL, -- Need M
 ra-ssb-OccasionMaskIndex INTEGER(0..15) OPTIONAL, -- Need M
 recoverySearchSpaceId SearchSpaceId OPTIONAL, -- Cond CF-BFR
```

-continued

```
    ra-Prioritization RA-Prioritization OPTIONAL, -- Need R
    beamFailureRecoveryTimer ENUMERATED{ms10, ms20, ms40, ms80, ms100,
ms150, ms200} OPTIONAL, -- Need M
    ...,
    [[
    msg1-SubcarrierSpacing-v1530 SubcarrierSpacing
        OPTIONAL -- Need M
    ]]
}
PRACH-ResourceDedicatedBFR::= CHOICE{
ssb BFR-SSB-Resource,
csi-RS  BFR-CSIRS-Resource
}
BFR-SSB-Resource::= SEQUENCE {
ssb SSB-Index,
ra-PreambleIndex INTEGER(0..63) OPTIONAL
...
}
BFR-CSI-RS-Resource::=SEQUENCE {
csi-RS NZP-CSI-RS-ResourceId,
 ra-OccasionList SEQUENCE(SIZE(1..maxRAOccasionsPerCSIRS)) OF
INTEGER(0..maxRAOccasions-1) OPTIONAL, – Need R
 ra-PreambleIndex INTEGER(0..63) OPTIONAL, – Need R
 ...
}
-- TAG-BEAM-FAILURE-RECOVERY-CONFIG-STOP
-- ASN1STOP
```

One or more UE variables maintaining a dedicated RS list for Beam Failure Recovery could be introduced, and an example is shown in bold and underline below.

```
-- ASN1START
-- TAG-VAR=BEAM-FAILURE-RECOVERY-CONFIG-START
VarBeamFailureRecoveryConfig::= SEQUENCE {
 bfr-DedicatedRSList SEQUENCE(SIZE(1..maxNrofCandidateBeams)) OF BFR-
DedicatedResource OPTIONAL
}
BFR-DedicatedResource::= SEQUENCE {
 bfr-CandidateBeamIndex INTEGER(1..maxNrofCandidateBeams),
 bfr-CandidateBeam BFR-CandidateBeam,
 ...
}
BFR-CandidateBeam::= CHOICE {
 ssb BFR-SSB-Resource,
 csi-RS BFR-CSIRS-Resource
}
BFR-SSB-Resource::= SEQUENCE {
 ssb SSB-Index,
 ra-PreambleIndex INTEGER(0...63),
 ...
}
BFR-CSI-RS-Resource::= SEQUENCE {
 csi-RS NZP-CSI-RS-ResourceId,
 ra-OccasionList SEQUENCE(SIZE(1..maxRAOccasionsPerCSIRS)) OF
INTEGER(0..maxRAOccasions-1) OPTIONAL, -- Need R
 ra-PreambleIndex INTEGER(0...63) OPTIONAL, -- Need R
}
-- TAG-VAR-BEAM-FAILURE-RECOVERY-CONFIG-STOP
-- ASN1STOP
```

SSB/NZP CSI-RS resource definition for BFR, for example, could include such information as time/frequency location and QCL assumptions, as illustrated by the elements highlighted in bold and underline below.

```
-- ASN1START
-- TAG-VAR=BEAM-FAILURE-RECOVERY-CONFIG-START
BFR-SSB-Resource::= SEQUENCE {
 ssb SSB-Index,
 ssbFrequency ARFCN-ValueNR,
 ra-PreambleIndex INTEGER(0..63),
 ...
}
BFR-CSI-RS-Resource::= SEQUENCE {
 csi-RS NZP-CSI-RS-ResourceId,
 resourceMapping CSI-RS-ResourceMapping,
 absoluteFrequencyCSI-RS ARFCN-ValueNR,
 periodicityAndOffset CSI-ResourcePeriodicityAndOffset OPTIONAL,
 qcl-Info TCI-StateId OPTIONAL,
 ra-OccasionList SEQUENCE(SIZE(1..maxRAOccasionsPerCSIRS)) OF
INTEGER(0..maxRAOccasions-1) OPTIONAL, -- Need R
 ra-PreambleIndex INTEGER(0..63) OPTIONAL, -- Need R
 ...
}
-- TAG-VAR-BEAM-FAILURE-RECOVERY-CONFIG-STOP
-- ASN1STOP
```

20

An example RRC IE and procedure that could be used if
an RRC Reconfiguration message carries a beam FailureRe-
coveryConfig object are shown below, and cause a UE to
copy content to a variable varBeamFailureRecoveryConfig.
See in particular the element in bold and underline.

```
-- ASN1START
-- TAG-RRCRECONFIGURATION-START
RRCReconfiguration-IEs: SEQUENCE {
 radioBearerConfig RadioBearerConfig OPTIONAL, -- Need M
 secondaryCellGroup OCTET STRING(CONTAINING CellGroupConfig)
OPTIONAL, -- Need M
 measConfig MeasConfig OPTIONAL, -- Need M
 beamFailureRecoveryConfig BeamFailureRecoveryConfig OPTIONAL, --
Need M
 lateNonCriticalExtension OCTET STRING OPTIONAL,
 nonCriticalExtension RRCReconfiguration-v1530-IEs
}
-- TAG-RRCRECONFIGURATION-STOP
-- ASN1STOP
```

40

According to procedure in an embodiment, a UE shall:

1> for each bfr-CandidateIndex included in the received
bfr-DedicatedRSList:

2> if an entry with the matching bfr-CandidateIndex
exists in the bfr-DedicatedRSList within the Var-
BeamFailureRecoveryConfig, for this entry:

3> reconfigure the entry with the value received for
this bfr-CandidateBeam;

2> else:

3> add a new entry for the received bfr-Candidate-
Beam to the bfr-DedicatedRSList within Var-
BeamFailureRecoveryConfig.

Some embodiments could involve introducing dedicated
resources for Beam Failure Detection. This could be imple-
mented in combination with or independently from other
features disclosed herein. In the example below, text in bold
and italic represents fields that could be deleted from current
NR Release 15 configurations.

```
-- ASN1START
-- TAG-RADIOLINKMONITORINGCONFIG-START
RadioLinkMonitoringConfig:= SEQUENCE {
 failureDetectionResourcesToAddModList SEQUENCE (SIZE
(1..maxNrofFailureDetectionResources)) OF RadioLinkMonitoringRS OPTIONAL, --
Need N
 failureDetectionResourcesToReleaseList SEQUENCE (SIZE
(1..maxNrofFailureDetectionResources)) OF RadioLinkMonitoringRS-Id OPTIONAL,
-- Need N
 beamFailureInstanceMaxCount ENUMERATED {n1,n2,n3,n4,n5,n6,n8,n10}
OPTIONAL, – Need R
 beamFailureDetectionTimer ENUMERATED {pbfd1, pbfd2, pbfd3, pbfd4,
pbfd5, pbfd6, pbfd8, pbfd10} OPTIONAL, – Need R
 ...
}
```

-continued

```
RadioLinkMonitoringRS::= SEQUENCE {
 radioLinkMonitoringRS-Id RadioLinkMonitoringRS-Id,
 purpose ENUMERATED {beamFailure, rlf, both},
 detectionResource CHOICE {
 ssb-Index SSB-Index,
 csi-RS-Index NZP-CSI-RS-ResourceId
 }
 ...
}
-- TAG-RADIOLINKMONITORINGCONFIG-STOP
-- ASN1STOP
```

The elements in bold and underline below illustrate an example of introducing UE variables maintaining a dedicated RS list for Beam Failure Detection.

```
-- ASN1START
-- TAG-VAR=BEAM-FAILURE-DETECTION-CONFIG-START
VarBeamFailureDetectionConfig::= SEQUENCE {
 bfd-DedicatedRSList SEQUENCE (SIZE
(1..maxNrofBeamFailureDetectionResources)) OF BFD-DedicatedResource
OPTIONAL
}
BFD-DedicatedResource::= SEQUENCE {
 bfd-RS-Index INTEGER (1..maxNrofBeamFailureDetectionResources),
 bfd-Resource BFD-Resource,
}
BFD-Resource::= CHOICE {
 ssb BFD-SSB-Resource,
 csi-RS BFD-CSI-RS-ResourceId
}
BFD-SSB-Resource::= SEQUENCE {
 ssb-Index SSB-Index,
 physCellId PhysCellId,
 ssbFrequency ARFCN-ValueNR,
 ...
}
-- TAG-VAR-BEAM-FAILURE-DETECTION-CONFIG-STOP
-- ASN1STOP
```

SSB/NZP CSI-RS resource definition for BFD, for example, could include such information as time/frequency location and QCL assumptions, as illustrated by the elements highlighted in bold and underline below.

```
-- ASN1START
-- TAG-VAR=BEAM-FAILURE-DETECTION-CONFIG-START
BFD-SSB-Resource::=   SEQUENCE {
 ssb    SSB-Index,
 ssbFrequency    ARFCN-ValueNR,
 ra-PreambleIndex    INTEGER (0..63),
 ...
}
BFD-CSIRS-Resource ::=   SEQUENCE {
 csi-RS   NZP-CSI-RS-ResourceId,
 resourceMapping    CSI-RS-ResourceMapping,
 absoluteFrequencyCSI-RS    ARFCN-ValueNR,
 periodicityAndOffset    CSI-ResourcePeriodicityAndOffset OPTIONAL,
 qcl-Info TCI-StateId,    OPTIONAL,
 ra-OccasionList    SEQUENCE (SIZE(1..maxRA-OccasionsPerCSIRS)) OF
INTEGER (0..maxRA-Occasions-1)    OPTIONAL, -- Need R
 ra-PreambleIndex   INTEGER (0..63) OPTIONAL, -- Need R
 ...
}
-- TAG-VAR-BEAM-FAILURE-DETECTION-CONFIG-STOP
-- ASN1STOP
```

An example RRC IE and procedure that could be used if an RRC

Reconfiguration message carries a beam FailureDetectionConfig object are shown below, and cause a UE to copy content to a variable varBeamFailureRecoveryConfig. See in particular the element in bold and underline.

```
-- ASN1START
-- TAG-RRCRECONFIGURATION-START
RRCReconfiguration-IEs: SEQUENCE {
  radioBearerConfig RadioBearerConfig OPTIONAL, -- Need M
  secondaryCellGroup OCTET STRING(CONTAINING CellGroupConfig)
OPTIONAL, -- Need M
  measConfig MeasConfig OPTIONAL, -- Need M
  beamFailureDetectionConfig BeamFailureDetectionConfig OPTIONAL, --
Need N
  lateNonCriticalExtension OCTET STRING OPTIONAL,
  nonCriticalExtension RRCReconfiguration-v1530-IEs
}
-- TAG-RRCRECONFIGURATION-STOP
-- ASN1STOP
```

According to procedure, in an embodiment a UE shall:
1> for each bfd-RSIndex included in the received bfd-DedicatedRSList:
  2> if an entry with the matching bfd-RS Index exists in the bfd-DedicatedRSList within the VarBeamFailureDetectionConfig, for this entry:
    3> reconfigure the entry with the value received for this bfd-Resource;
  2> else:
    3> add a new entry for the received bfd-Resource to the bfd-DedicatedRSList within VarBeamFailureDetectionConfig.

The detailed examples provided above are intended solely for illustrative purposes. Embodiments could include subsets of one or more disclosed features, implemented as shown and/or described in one or more examples or in different ways that are still consistent with the present disclosure.

For example, a UE in accordance with the teachings herein could be considered as having a new memory or configuration module, the purpose of which is to maintain a record such as a list of communication resources for beam management and a record such as a list of QCL assumptions linking reference signals together. Network equipment such as a gNB could configure communication resources for beam management at the UE using higher-layer signaling such as RRC signaling. Those beam management resources could belong to one or more cells, each cell corresponding to a given gNB for example. In an embodiment, each resource could correspond to a given beam transmitted by a given gNB. QCL assumptions link reference signals together, and linkage could be established by configuring a QCL information object in a given physical channel (e.g. PDCCH, PDSCH). After a QCL information object is configured, it links the reference signals sent by a given physical channel to a reference signal defined in the UE's beam management module.

The UE could perform functions of beam management such as Beam Failure Detection (BFD) and/or Beam Failure Recovery (BFR) based on the communication resources configured in the BM module. The UE could maintain dedicated BFD and BFR modules configured by network equipment via higher-layer signaling. The BFD and BFR modules refer to resources defined in the beam management module (e.g., through identifiers of resources) in some embodiments.

Network equipment could inform the UE about the QCL assumptions to use for demodulating PDCCH and PDSCH DMRSs transmitted as part of PDCCH and PDSCH channels at any given time, using semi-static (MAC-CE) or dynamic (DCI) commands. These commands link the reference signals sent as part of the channel with a reference signal defined in the UE's beam management module. Reference signals defined in the UE's beam management module could belong to one or more cells or gNBs, thereby enabling mobility between cells. Detailed examples of RRC signaling for the beam management module, beam management resource list and QCL assumption list are provided above.

A UE beam management module could thus define and/or manage communication resources for beam management as well as corresponding QCL assumptions that the UE can make regarding reference signals sent as part of a physical channel. The beam management module is separate from (e.g., stored separately from, located outside of, or otherwise implemented externally from) a module that is used to hold the cell-specific configuration such as serving cell configuration. Technical advantages of such a solution could include, for example, any one or more of the following:

enabling beam management to be carried out between cells, including beam switching (e.g., QCL assumption update), Beam Failure Detection and/or Beam Failure Recovery;

reducing data connectivity interruption due to mobility, by reducing the amount of higher-layer signaling exchange between the UE and the network and thus reducing delay associated with reception of such higher-layer signaling;

functions such as L3 filtering, cell-level filtering, and/or beam selection can be performed at the network side, on L1 measurements sent by the UE, and commands for beam switching in accordance with the measurements sent by the UE can be sent to the UE by network equipment.

Communication resources defined in the beam management module correspond to different beams, which could belong to different gNBs. Those resources are configured upon the UE completing initial access and correspond to one or more gNBs. Unlike in LTE or NR Release 15, the UE does not need to be reconfigured every time it performs a handover, because information about communication resources used by different gNBs is already available at the UE. The only difference between a source and target cell from the physical layer's perspective is the reference signal being used to demodulate the signals from the PDCCH/PDSCH.

Network equipment could instruct the UE as to which reference signals are the ones to use for PDCCH and PDSCH reception. If a UE is at the edge between two cells, network equipment could instruct the UE to switch to beams used by a target cell without breaking data connectivity or sending a higher-layer signaling message to initiate a handover. Such breaking of data connectivity or sending a higher-layer signaling message can lead to interruption in the UE's connectivity.

As noted above, L3 filtering on L1 measurements sent by the UE could be performed at the network side, thus potentially simplifying the UE behavior by treating inter-cell mobility the same way as it treats beam management.

Either or both of beam management and QCL assumption management could distinguish embodiments over NR Release 15 solutions that are referenced herein. For example, in some embodiments a UE has a module to maintain a record such as a list of resources for beam management. As noted above, communication resources for beam management at the UE could be configured by network equipment using higher-layer signaling such as RRC signaling. The beam management resources could belong to one or more gNBs, with each gNB corresponding to a different cell for example. In some embodiments, each resource corresponds to a given beam transmitted or received by a given gNB.

A UE could perform functions of beam management such as Beam Failure Detection and/or Beam Failure Recovery based on the resources configured in the beam management module. The UE could maintain dedicated BFD and BFR modules configured by network equipment via higher-layer signaling. The BFD and BFR modules refer to communication resources defined in the beam management module (e.g., through identifiers of resources).

In some embodiments, the UE has a module that defines resources for beam management, and the beam management module is located outside of a module that is used to hold cell-specific configuration such as serving cell configuration. Technical advantages could include either or both of the following:

enabling beam management to be carried out between cells;

functions such as L3 filtering, cell-level filtering, and beam selection on L1 measurements sent by the UE could be performed at a network side, and network equipment could send commands for beam switching in accordance with the measurements sent by the UE.

Communication resources defined in the beam management module correspond to different beams, which could belong to different gNBs. As a result, the UE does not need to be reconfigured every time it performs a handover, because information about communication resources used by different gNBs is already available at the UE.

As noted above, L3 filtering on L1 measurements sent by the UE could be performed at the network side, thus potentially simplifying the UE behavior by treating inter-cell mobility the same way as it treats beam management.

In an embodiment, the UE has a new module whose purpose is to maintain a list of QCL assumptions linking reference signals together. Network equipment configures those QCL assumptions at the UE using higher-layer signaling (i.e. RRC). Those QCL assumptions may correspond to one or more gNBs, with each gNB corresponding to a different cell in some embodiments. QCL assumptions link reference signals together, and the linkage is established by configuring a QCL information object in a given physical channel (e.g. PDCCH, PDSCH) in some embodiments.

QCL assumption management could also or instead distinguish disclosed embodiments over NR Release 15 solutions that are referenced herein. In some embodiments, the UE has a module to maintain a record such as a list of QCL assumptions linking reference signals together. Network equipment configures those QCL assumptions at the UE using higher-layer signaling such as RRC signaling. Those QCL assumptions may correspond to one or more gNBs, with each gNB corresponding to a different cell in some embodiments. QCL assumptions link reference signals together, and the linkage is established by configuring a QCL information object in a given physical channel (e.g. PDCCH, PDSCH) in some embodiments.

Network equipment could inform a UE about QCL assumptions to use for demodulating PDCCH and PDSCH channels at any time, using semi-static or dynamic commands (MAC-CE and DCI respectively). These commands link the reference signals sent as part of the channel with a reference signal defined in the UE's beam management module. Reference signals defined in the UE's beam management module could belong to one or more gNBs, thus enabling UE mobility between cells.

In some embodiments, a UE has a beam management module that defines QCL assumptions for one or more gNBs, and the beam management module is located outside of a module used to hold cell-specific configuration such as serving cell configuration. Technical advantages of such a solution could include either or both of the following:

enabling beam management to be carried out between cells;

reducing data connectivity interruption due to mobility, by reducing the amount of higher-layer signaling exchange between the UE and network equipment and thus reducing delay associated with reception of such higher-layer signaling.

Network equipment could instruct the UE as to which reference signals are the ones to use for PDCCH and PDSCH reception. If a UE is at the edge between two cells, network equipment could instruct the UE to switch to beams used by a target cell without breaking data connectivity or sending a higher-layer signaling message to initiate a handover.

Figures 11, 12:
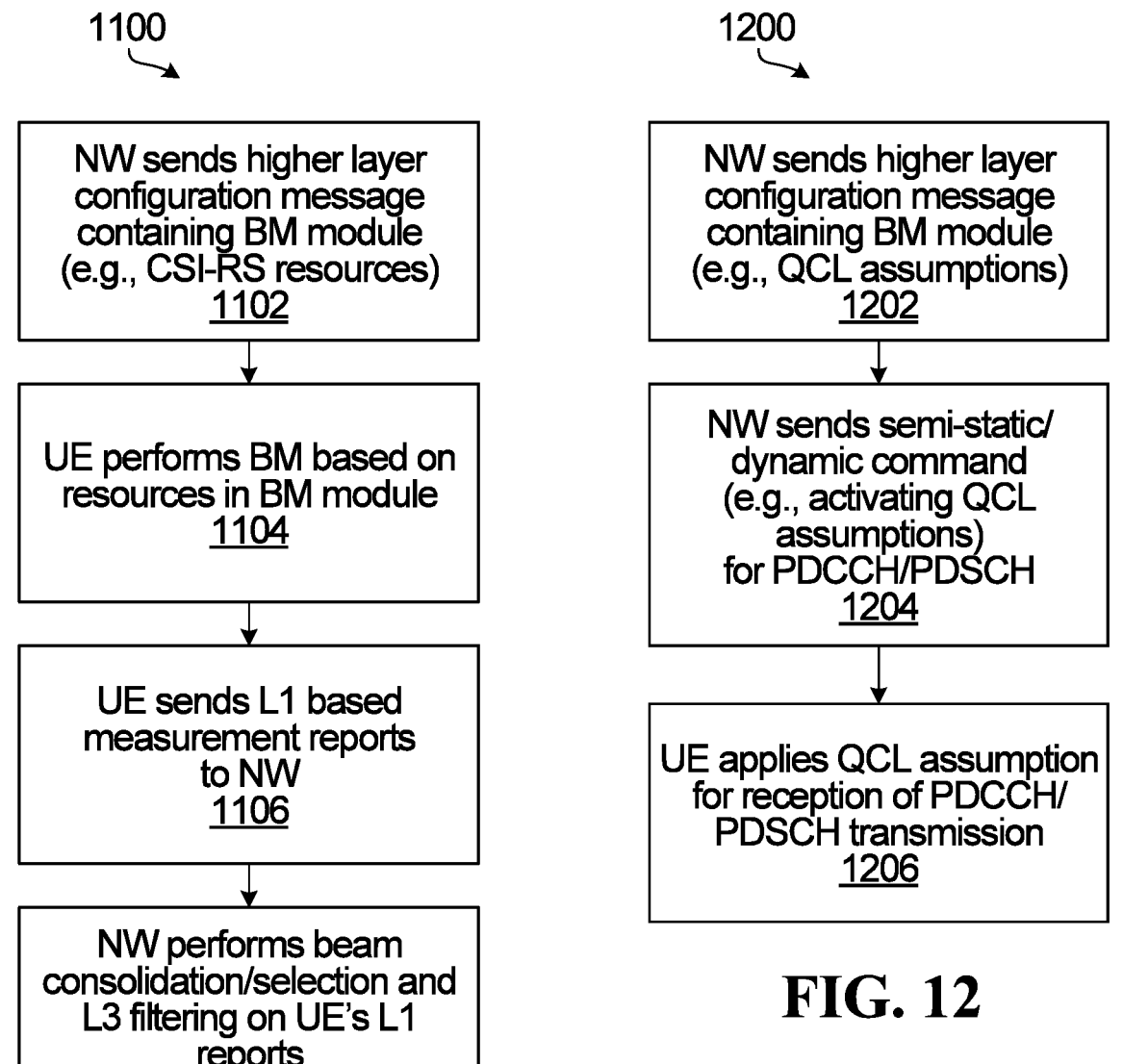
FIG. 11 is a flow diagram illustrating a method according to another embodiment.
FIG. 12 is a flow diagram illustrating a method according to a further embodiment.
Figure 13:
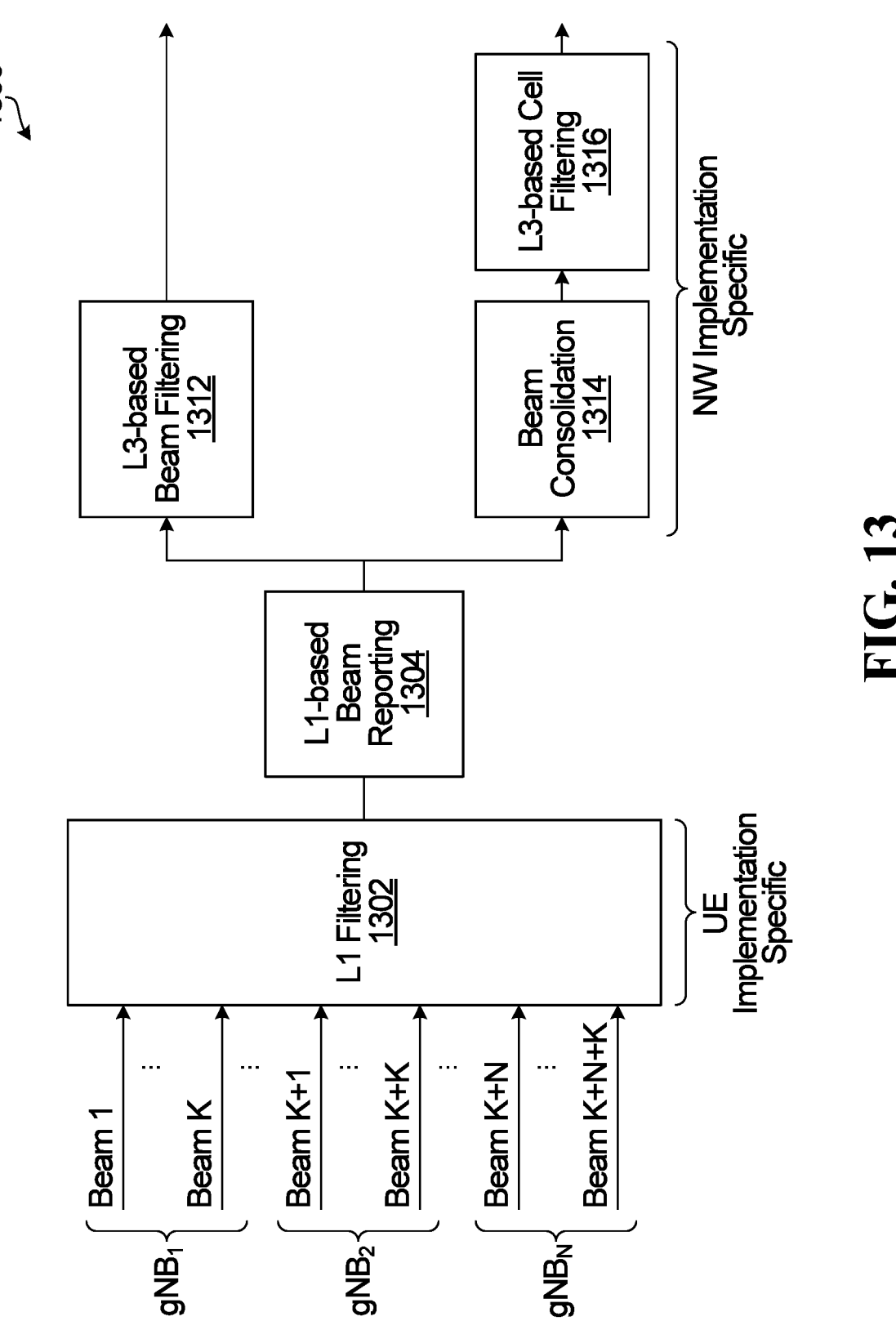
FIG. 13 is a block diagram illustrating features that could be implemented in a communication system at a UE and network equipment.

These and other features are illustrated in FIGS. 11-13.

FIG. 11 is a flow diagram illustrating a method according to another embodiment. The example method 1100 involves sending at operation 1102, by network equipment, a higher-layer configuration message containing a beam management module or configuration, in this example CSI-RS resources. At operation 1104, FIG. 11 illustrates a UE performing beam management based on the resources in the received beam management module, which is an example of a higher-layer configuration referenced herein. At operation 1106 the UE performs channel measurements and reports to the network equipment, and at 1108 the network equipment performs beam consolidation/selection and optionally L3 filtering based on the UE's L1 measurement reports.

FIG. 11 could include other operations as well, such as determining, by the network equipment, whether the UE is to transition to a different beam and sending, by the network equipment to the UE, a beam switching command or indication responsive to determining that the UE is to transition to a different beam.

FIG. 12 is a flow diagram illustrating a method according to a further embodiment. In the example method 1200, network equipment sends a higher-layer configuration message containing a beam management module or configuration, in this example QCL assumptions. At operation 1204, FIG. 12 illustrates the network equipment sending a semi-static/dynamic command activating QCL assumptions for channels, shown as PDCCH/PDSCH. Such a command could be sent to a UE for initial activation, and/or after determining that the UE is to transition to a different beam. FIG. 12 also illustrates, at operation 1206, the UE applying the activated QCL assumptions for reception of PDCCH/PDSCH transmissions. Similar features could also or instead be provided for UL transmissions.

Embodiments have been disclosed by way of example herein primarily in the context of methods. Apparatus or system implementations are also contemplated. FIG. 13, for example, is a block diagram illustrating features that could be implemented in a communication system 1300 at a UE and network equipment.

As shown, a UE could be configured by network equipment to monitor communication resources such as a number K of beams associated with each of a number N of gNBs. Each subset of beams associated with a gNB includes the same number of beams in the example shown, but in other embodiments different gNBs could have different numbers of beams.

The UE performs channel measurements and could report raw measurements or, as shown, filtered measurements based on L1 filtering at operation 1302. Channel measurement reporting is shown in FIG. 13 as L1-based beam reporting at operation 1304.

At the network side, L3-based beam filtering of measurement reports could be applied at operation 1312, or beam consolidation 1314 and L3-based cell filtering 1316 could be applied. As described herein, in some embodiments these functions could be performed at the network side rather than the UE side.

Figure 14:
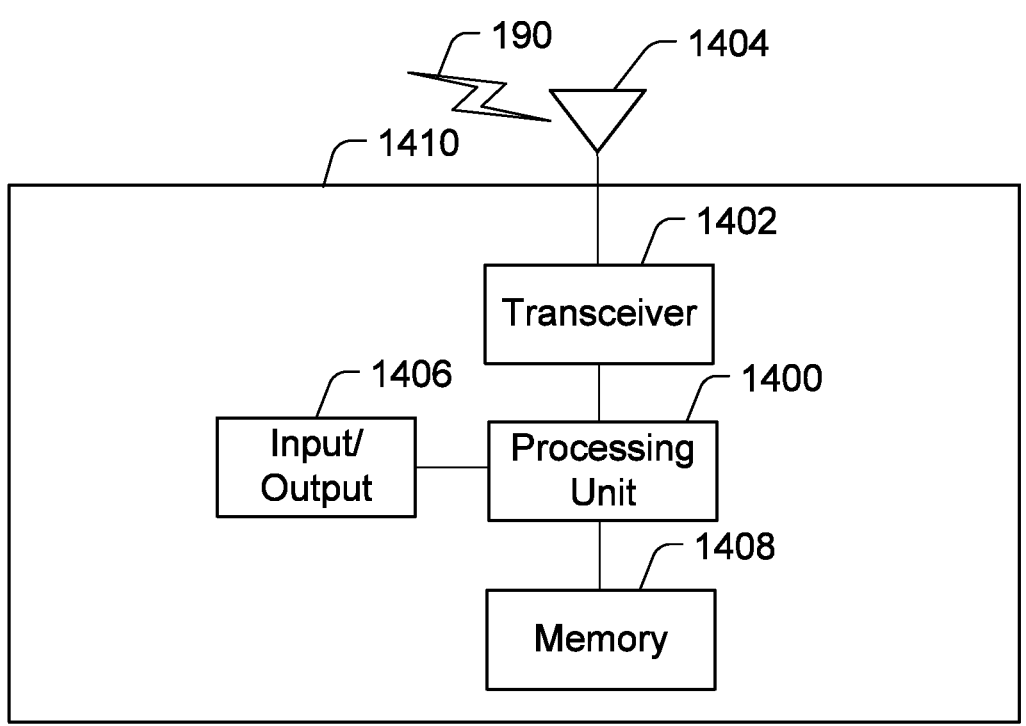
FIGS. 14 and 15 illustrate example devices that may implement the methods and teachings according to this disclosure.
Figure 15:
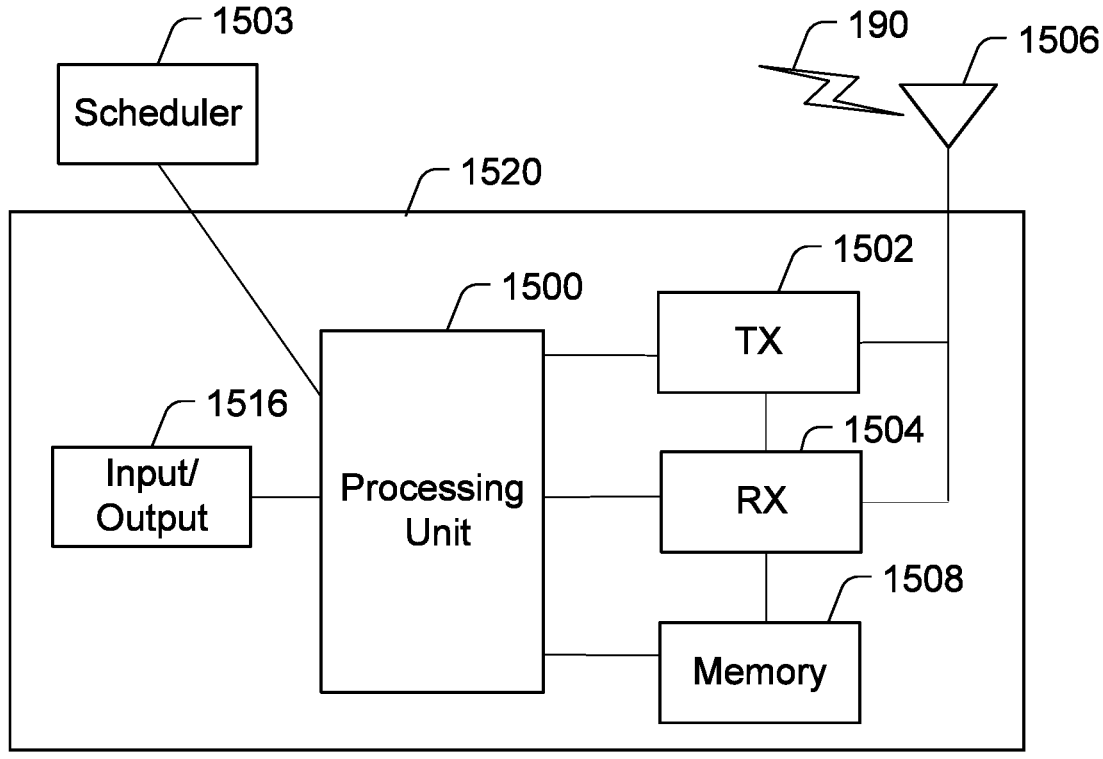

FIGS. 14 and 15 illustrate example devices that may implement the methods and teachings according to this disclosure, in more detail than FIG. 13. In particular, FIG. 14 illustrates an example ED 1410, and FIG. 15 illustrates an example base station 1520. These components could be used in the system 100 (FIG. 1) or in any other suitable system.

As shown in FIG. 14, the ED 1410 includes at least one processing unit 1400. The processing unit 1400 implements various processing operations of the ED 1410. For example, the processing unit 1400 could perform signal coding, data processing, power control, input/output processing, or any other functionality enabling the ED 1410 to operate in a communication system. The processing unit 1400 may also be configured to implement some or all of the functionality and/or embodiments described in more detail above. Each processing unit 1400 includes any suitable processing or computing device configured to perform one or more operations. Each processing unit 1400 could, for example, include a microprocessor, microcontroller, digital signal processor, field programmable gate array, or application specific integrated circuit.

The ED 1410 also includes at least one transceiver 1402. The transceiver 1402 is configured to modulate data or other content for transmission by at least one antenna or NIC (Network Interface Controller) 1404. The transceiver 1402 is also configured to demodulate data or other content received by the at least one antenna 1404. Each transceiver 1402 includes any suitable structure for generating signals for wireless transmission and/or processing signals received wirelessly or by wire. Each antenna 1404 includes any suitable structure for transmitting and/or receiving wireless signals. One or multiple transceivers 1402 could be used in the ED 1410, and one or multiple antennas 1404 could be used in the ED 1410. Although shown as a single functional unit, a transceiver 1402 could be implemented using at least one transmitter and at least one separate receiver.

The ED 1410 further includes one or more input/output devices 1406 or interfaces. The input/output devices 1406 facilitate interaction with a user or other devices (network communications) in the network. Each input/output device 1406 includes any suitable structure for providing information to or receiving/providing information from a user, such as a speaker, microphone, keypad, keyboard, display, or touch screen, including network interface communications.

In addition, the ED 1410 includes at least one memory 1408. The memory 1408 stores instructions and data used, generated, or collected by the ED 1410. For example, the memory 1408 could store software instructions or modules configured to implement some or all of the functionality and/or embodiments described above and that are executed by the processing unit(s) 1400. Each memory 1408 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 15, the base station 1520 includes at least one processing unit 1500, at least one transmitter 1502, at least one receiver 1504, one or more antennas 1506, at least one memory 1508, and one or more input/output devices or interfaces 1516. A transceiver, not shown, may be used instead of the transmitter 1502 and receiver 1504. A scheduler 1503 may be coupled to the processing unit 1500. The scheduler 1503 may be included within or operated separately from the base station 1520. The processing unit 1500 implements various processing operations of the base station 1520, such as signal coding, data processing, power control, input/output processing, or any other functionality. The processing unit 1500 can also be configured to implement some or all of the functionality and/or embodiments described in more detail above. Each processing unit 1500 includes any suitable processing or computing device configured to perform one or more operations. Each processing unit 1500 could, for example, include a microprocessor, microcontroller, digital signal processor, field programmable gate array, or application specific integrated circuit.

Each transmitter 1502 includes any suitable structure for generating signals for wireless transmission to one or more EDs or other devices. Each receiver 1504 includes any suitable structure for processing signals received wirelessly or by wire from one or more EDs or other devices. Although shown as separate components, at least one transmitter 1502 and at least one receiver 1504 could be combined into a transceiver. Each antenna 1506 includes any suitable structure for transmitting and/or receiving wireless signals. While a common antenna 1506 is shown here as being coupled to both the transmitter 1502 and the receiver 1504, one or more antennas 1506 could be coupled to the transmitter(s) 1502, and one or more separate antennas 1506 could be coupled to the receiver(s) 1504. Each memory 1508 includes any suitable volatile and/or non-volatile storage and retrieval device(s) such as those described above in connection to the ED 1410. The memory 1508 stores instructions and data used, generated, or collected by the base station 1520. For example, the memory 1508 could store software instructions or modules configured to implement some or all of the functionality and/or embodiments described herein and that are executed by the processing unit(s) 1500.

Each input/output device 1516 facilitates interaction with a user or other devices (network communications) in the network. Each input/output device 1516 includes any suitable structure for providing information to or receiving/providing information from a user, including network interface communications.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by these and/or other modules. The respective units/modules may be implemented using hardware, components that execute software, or a combination thereof. For instance, one or more of the units/modules may be or include one or more integrated circuits, such as field programmable gate arrays (FPGAs) or application-specific integrated circuits (ASICs). It will be appreciated that where the modules are implemented using software, they may be retrieved by a processor, in whole or part as needed, individually or together for processing, in single or multiple instances, and that the modules themselves may include instructions for further deployment and instantiation.

In general, hardware, firmware, components which execute software, or some combination thereof could be used in implementing features disclosed herein. Electronic devices that might be suitable for implementing any or all of these components include, among others, microprocessors, microcontrollers, Programmable Logic Devices (PLDs), Field Programmable Gate Arrays (FPGAs), Application Specific Integrated Circuits (ASICs), and other types of "intelligent" integrated circuits.

Any of various types of memory devices could be implemented. The memory 1408 and/or the memory 1508, for example, could include one or more physical memory devices. Solid-state memory devices such as a Flash memory device, and/or memory devices with movable or even removable storage media, could be implemented.

FIG. 14 and FIG. 15 illustrate examples of a UE and network equipment, respectively, in which embodiments could be implemented. More generally, an apparatus such as a UE could include a processor and a non-transitory computer readable storage medium, such as the processing unit 1400 and memory 1408 in FIG. 14. In such an embodiment, the storage medium stores programming for execution by the processor, and the programming could include instructions to receive, by the UE from a first base station, an indication signal for indicating to the UE a communication resource for a second reference signal from a higher-layer configuration from the first base station to the UE. The communication resource for the second reference signal is associated with a second base station, and is part of the higher-layer configuration. The indication signal could be received, for example, through a receiver or a transceiver such as the transceiver 1402 in FIG. 14. The higher-layer configuration includes a communication resource for a first reference signal associated with the first base station, and also includes the communication resource for the second reference signal associated with the second base station.

The programming could include instructions to communicate, by the UE with the second base station, a data transmission or a control signal transmission using a respective data channel or control channel associated with the communication resource for the second reference signal. Such communication could be through a transmitter or transceiver, for example, such as the transceiver 1402 in FIG. 14.

Embodiments could include other features, such as any one or more of the following, in any of various combinations:

the programming further includes instructions to receive, by UE, the higher-layer configuration from the first base station;

the indication signal is or includes QCL information;

the indication signal is or includes a MAC-CE indication of the communication resource for the second reference signal;

the indication signal is or includes a DCI indication of the communication resource for the second reference signal;

the indication signal is or includes an RRC indication of the communication resource for the second reference signal;

the programming further includes instructions to perform, by the UE, channel measurements for a channel used for communicating a data transmission or a control signal transmission with the first base station;

the programming further includes instructions to communicate, by the UE to the first base station, an indication of the channel measurements;

the higher-layer configuration further includes a communication resource for beam failure recovery.

Other features that could be implemented in UE embodiments could be or become apparent, for example, from the method embodiments disclosed herein.

A base station, which is illustrative of network equipment, could include a processor and a non-transitory computer readable storage medium, such as the processing unit 1500 and memory 1508 in FIG. 15. In such an embodiment, the storage medium stores programming for execution by the processor, and the programming could include instructions to generate, by the base station, an indication signal for indicating to a UE a communication resource for a second reference signal from a higher-layer configuration from the base station. The communication resource for the second reference signal is associated with a second base station, and is part of the higher-layer configuration. The higher-layer configuration includes a communication resource for a first reference signal associated with the first base station, and also includes the communication resource for the second reference signal associated with the second base station.

The programming could include instructions to transmit the indication signal from the base station to the UE, to enable the UE to communicate with the second base station, a data transmission or a control signal transmission using a respective data channel or control channel associated with the communication resource for the second reference signal. The indication signal could be transmitted, for example, through a transceiver or a transmitter such as the transmitter 1502 in FIG. 15.

Network equipment embodiments could include other features, such as any one or more of the following, in any of various combinations:

the programming further includes instructions to transmit, by the base station, the higher-layer configuration to the UE;

the indication signal is or includes QCL information;

the indication signal is or includes a MAC-CE indication of the communication resource for the second reference signal;

the indication signal is or includes a DCI indication of the communication resource for the second reference signal;

the indication signal is or includes an RRC indication of the communication resource for the second reference signal;

the programming further includes instructions to receive, by the base station from the UE, an indication of channel measurements performed by the UE for a channel used for communicating a data transmission or a control signal transmission with the base station;

the higher-layer configuration further includes a communication resource for beam failure recovery.

Other features that could be implemented in network equipment embodiments could be or become apparent, for example, from the method embodiments disclosed herein.

Whereas beam management features are limited to intra-cell in NR Release 15 and inter-cell beam management is treated as a mobility problem (i.e., when a UE changes cells it is reconfigured via higher-layer signaling), in accordance with aspects of the present disclosure beam management features are extended to inter-cell mobility between cells. Some embodiments enable inter-cell beam management, for example by managing QCL assumptions independently from serving cell configurations.

In some embodiments, QCL assumptions are maintained for different beams corresponding to different gNBs to enable beam switching between cells. Physical layer control/data channels could be semi-statically or dynamically signaled about which QCL assumptions are to be used for beam management for intra-cell and inter-cell scenarios.

Embodiments could enable mobility without RRC involvement across cells, for example by defining resources for beam management (e.g., beam failure detection, beam failure recovery) independently from serving cell configurations.

UE-centric beam management could be provided in some embodiments. For example, beam management resource configuration could be managed independently of cells, and in some embodiments is customizable for each UE.

In some embodiments, the RRC reconfiguration IE carries a Beam Management IE with the definition of Beam Management resources and resource sets. In another embodiment, network equipment configures resource sets for Beam Management and configures resources to the UE which may be used for different purposes (e.g. channel estimation, beam management, channel state information). Each BM resource set contains one or more resources (e.g. SS/PBCH block or NZP-CSI-RS). Each resource set may correspond to a TRP set that belongs to a source cell or a neighbor cell. The one or more resources configured for each BM resource set are defined in another RRC IE, e.g. a UE internal variable or an IE defined inside a cell group configuration IE.

The BM resource set may contain parameters used by the UE for the purpose of beam measurement and/or deriving beam measurement results. An example of a UE procedure for resource sets defined using NZP CSI-RS resources is as follows:

If the UE is configured to derive RSRP, RSRQ and SINR measurement results for BM resource sets configured in the beamManagementCsirsResourceSetToAddModList parameter, then the UE shall:

1> For each beam set measurement quantity to be derived based on CSI-RS:

2> if NrofCsirsToAverage in the BM resource set is not configured; or

2> if absThresholdCSI-RS in the BM resource set is not configured; or

2> if the highest beam measurement quantity value is below or equal to absThresholdCSI-RS:

3> derive each beam measurement quantity based on the BM resource with the highest beam measurement quantity value;

2> else:

3> derive each beam set measurement quantity based on CSI-RS as the linear power scale average of the highest beam measurement quantity values above absThresholdCSI-RS where the total number of averaged beams shall not exceed NrofCsirsToAverage.

Network equipment can take advantage of configuring BM resource sets to the UE and the network equipment can keep a record of correspondence between cells/TRPs and BM resource sets. This is one way of achieving "cell-transparent", "UE-centric" or "UE-specific" Beam Management.

If a UE is configured with a BM resource set containing one or more NZP CSI-RS resources without any parameter providing a timing reference for demodulating those resources, then the UE may assume that the source cell's timing reference applies to the NZP CSI-RS resources in that BM resource set.

In some embodiments, network equipment uses MAC-CE commands in order to indicate which TCI states are to be used by the UE for demodulating PDCCH or PDSCH DMRSs. TCI states correspond to individual BM resources (e.g. SS/PBCH block, NZP CSI-RS) and for each resource a given QCL assumption type is configured (e.g. delay spread, average delay, Doppler spread, Doppler shift, Spatial Rx filter). In another embodiment, network equipment uses TCI states corresponding to BM resource sets and a given QCL assumption type is configured. The BM resources contained in the BM resource set all apply the QCL assumption given in the TCI state. An example of the TCI-State and QCL-Info IEs is given below:

```
-- ASN1START
-- TAG-TCI-STATE-START
TCI-State::= SEQUENCE {
 tci-StateId TCI-StateId,
 qcl-Type1 QCL-Info,
 qcl-Type2 QCL-Info OPTIONAL,  -- Need R
}
QCL-Info::= SEQUENCE {
 referenceSignalSet CHOICE {
 csi-rs NZP-CSI-RS-ResourceSetId,
 ssb CSI-SSB-ResourceSetId
 }
 qcl-Type ENUMERATED {typeA, typeB, typeC, typeD},
 ...
}
```

```
-- TAG-TCI-STATE-STOP
-- ASN1STOP
```

In an embodiment, network equipment sends a MAC-CE command with TCI state indications that could be similar to those in previous embodiments described above. One difference in the present embodiment could be that the TCI state with the matching TCI-StateId will indicate a set of resources as opposed to individual resource.

One example of UE behaviour in response to receiving a TCI indication from the network indicating a BM resource set and a QCL assumption to use for resources in that BM resource set, is to monitor all the resources that belong to the indicated BM resource set and apply the QCL assumptions it derived for each resource in the BM resource set towards the demodulation of the PDCCH/PDSCH DMRSs.

Another example of UE behaviour in response to receiving a TCI indication from the network indicating a BM resource set and a QCL assumption to use for resources in that BM resource set, is to monitor all the resources that belong to the indicated BM resource set using some priority rule.

As an example: the UE could use a priority rule based on the periodicity of the resource (e.g. SS/PBCH block or NZP CSI-RS), such that a UE uses QCL assumptions from aperiodic resources with the highest priority, followed by semi-persistent resources and finally by periodic resources. If the indicated BM resource set contains at least one aperiodic resource, then the UE uses the QCL assumptions from the at least one aperiodic resources to demodulate PDCCH/PDSCH DMRSs. If the indicated BM resource set does not contain aperiodic resources and contains at least one semi-persistent resource, then the UE uses the QCL assumptions from the at least one semi-persistent resources to demodulate PDCCH/PDSCH DMRSs. If the indicated BM resource set does not contain aperiodic resources and does not contain semi-persistent resources and contains at least one periodic resource, then the UE uses the QCL assumptions from the at least one periodic resources to demodulate PDCCH/PDSCH DMRSs.

An example of the NZP CSI-RS resource IE is given below:

riodic, then it is an aperiodic NZP CSI-RS. A BM resource set may contain one or more of aperiodic, semi-persistent or periodic resources, and therefore a BM resource could carry or include resources of different type of periodicity.

In some embodiments, the RRC reconfiguration IE carries a Beam Failure Recovery IE with the definition of candidate beams corresponding to source and neighbour cells. In another embodiment, network equipment configures the UE with a control resource set (CORESET) for the purpose of Beam Failure Recovery.

A UE could be configured with a CORESET for Beam Failure Recovery through higher-layer configuration. The RRC IE holding the BFR CORESET in UE memory is stored outside of IEs used for storing serving cell configurations. A UE monitors PDCCH candidates in one or more search spaces located on the BFR CORESET. The network deployment is done in such a way that the source and neighbor cells a UE monitors signals use the same BFR CORESET.

In an embodiment, a UE maintains candidate beams as part of the BFR IE. After the UE detects a certain number of beam failure instances, the UE starts by scanning through the candidate beams configured in the BFR IE. The UE selects the first candidate beam whose signal quality is above a threshold defined in the BFR IE. Once the UE has found such a candidate beam, the UE starts the beam failure recovery request procedure. An example of the procedure followed by the UE in an embodiment is as follows:

1> If a UE is configured with a Beam Failure Recovery IE and the MAC entity of the UE transmitted a random access preamble for beam failure recovery request:
   2> the UE starts the random access response window as configured in the Beam Failure Recovery IE;
   2> the UE monitors for a PDCCH transmission scrambled by the UE's C-RNTI on a search space

```
-- ASN1START
-- TAG-NZP-CSI-RS-RESOURCE-START
NZP-CSI-RS-Resource::= SEQUENCE {
  nzp-CSI-RS-ResourceId NZP-CSI-RS-ResourceId,
  resourceMapping CSI-RS-ResourceMapping,
  powerControlOffset INTEGER (-8..15),
  powerControlOffsetSS ENUMERATED {db-3, db0, db3, db6} OPTIONAL, -- Need
R
  scramblingID ScramblingId,
  resourceType ENUMERATED{aperiodic, semiPersistent, periodic},
  periodicityAndOffset CSI-ResourcePeriodicityAndOffset OPTIONAL, -- Cond
PeriodicOrSemiPersistent
  ...
}
-- TAG-NZP-CSI-RS-RESOURCE-STOP
-- ASN1STOP
```

NZP CSI-RS resource configuration could include a parameter indicating the type of the resource, i.e. whether it is an aperiodic, semi-persistent or periodic NZP CSI-RS resource. Based on the above example, if an NZP CSI-RS resource is configured with resource Type field set to apelocated on the BFR CORESET while the random access response window is still running.

1> Else:
   2> the UE starts the random access response window as configured in the Random Access IE;

2> the UE monitors for a PDCCH transmission scrambled by the UE's RA-RNTI while the random access response window is still running.

In another embodiment, network equipment configures the UE with an RNTI for beam failure recovery purposes, or BFR-RNTI, in the BFR IE. A UE is configured with one or more CORESET through higher-layer configuration. The BFR IE in UE memory is stored outside of IEs used for storing serving cell configurations. A UE monitors PDCCH candidates in one or more search spaces located on the CORESET identified by CORESETId=0. The network deployment is done in such a way that the source and neighbor cells share the pool of RNTIs for Beam Failure Recovery, and therefore source and neighbor cells can communicate with the UE using the BFR-RNTI.

In an embodiment, a UE maintains candidate beams as part of the BFR IE. After the UE detects a certain number of beam failure instances, the UE starts by scanning through the candidate beams configured in the BFR IE. The UE selects the first candidate beam whose signal quality is above a threshold defined in the BFR IE. Once the UE has found such a candidate beam, the UE starts the beam failure recovery request procedure. An example of the procedure followed by the UE in an embodiment is as follows:

1> If a UE is configured with a Beam Failure Recovery IE and the MAC entity of the UE transmitted a random access preamble for beam failure recovery request:
  2> the UE starts the random access response window as configured in the Beam Failure Recovery IE;
  2> the UE monitors for a PDCCH transmission scrambled by the UE's BFR-RNTI on a search space located on the CORESET identified by CORESETId=0 while the random access response window is still running.
1> Else:
  2> the UE starts the random access response window as configured in the Random Access IE;
  2> the UE monitors for a PDCCH transmission scrambled by the UE's RA-RNTI while the random access response window is still running.

The UE monitors PDCCH candidates for DCI formats with CRC scrambled by a BFR-RNTI.

In another embodiment, network equipment configures the UE with a BFR CORESET and an RNTI for beam failure recovery purposes, or BFR-RNTI, in the BFR IE.

A UE is configured with a CORESET for Beam Failure Recovery through higher-layer configuration. The RRC IE holding the BFR CORESET in UE memory is stored outside of IEs used for storing serving cell configurations. A UE monitors PDCCH candidates in one or more search spaces located on the BFR CORESET. The network deployment is done in such a way that the source and neighbor cells a UE monitors signals from use the same BFR CORESET.

A UE maintains candidate beams as part of the BFR IE in some embodiments. After the UE detects a certain number of beam failure instances, the UE starts by scanning through the candidate beams configured in the BFR IE. The UE selects the first candidate beam whose signal quality is above a threshold defined in the BFR IE. Once the UE has found such a candidate beam, the UE starts the beam failure recovery request procedure. An example of the procedure followed by the UE in an embodiment is as follows:

1> If a UE is configured with a Beam Failure Recovery IE and the MAC entity of the UE transmitted a random access preamble for beam failure recovery request:
  2> the UE starts the random access response window as configured in the Beam Failure Recovery IE;

2> the UE monitors for a PDCCH transmission scrambled by the UE's BFR-RNTI on a search space located on the BFR CORESET while the random access response window is still running.
1> Else:
  2> the UE starts the random access response window as configured in the Random Access IE;
  2> the UE monitors for a PDCCH transmission scrambled by the UE's RA-RNTI while the random access response window is still running.

In some embodiments, the network configures the UE with resources (e.g. SS/PBCH blocks, NZP CSI-RS) for Beam Management, which may be transmitted from source or neighbor cells, and with TCI states that associate resources with QCL assumptions (e.g. delay spread, average delay, etc.). Network equipment could use MAC-CE commands to indicate to the UE which reference signals use and what QCL assumptions to make in order to demodulate PDCCH/PDSCH DMRSs. In another embodiment, the UE could use the configuration of an active bandwidth part as a mechanism to implicitly indicate which BM resources the UE should monitor.

As a first example, if the UE is configured with an active downlink bandwidth part (BWP) using higher-layer configuration and the UE is configured with BM resources (e.g. NZP CSI-RS) whose bandwidth is contained within the bandwidth of the BWP and whose subcarrier spacing is the same as the subcarrier spacing used by the active DL BWP, then the UE could implicitly assume that it can monitor those BM resources and use QCL assumption type QCL-TypeD in order to demodulate PDCCH/PDSCH DMRSs.

As a second example, if the UE is configured with an active DL BWP using higher-layer configuration and the UE is configured with BM resource sets and all the resources in the BM resource set are configured such that their bandwidth is contained with the bandwidth of the BWP and their subcarrier spacing is the same as that of the active DL BWP, then the UE could implicitly assume that it can monitor those BM resources and use QCL assumption type QCL-TypeD in order to demodulate PDCCH/PDSCH DMRSs.

As a third example, if the UE is configured with an active DL BWP using higher-layer configuration and the UE is configured with BM resource sets and all the resources in the BM resource set are configured such that their bandwidth is contained with the bandwidth of the BWP and their subcarrier spacing is the same as that of the active DL BWP, if the BM resource sets contain at least one periodic resource then the UE could implicitly assume that it can monitor those periodic BM resources and use QCL assumption type QCL-TypeD in order to demodulate PDCCH/PDSCH DMRSs.

For all three examples outlined above, the UE could equivalently use QCL assumptions QCL-TypeA, QCL-TypeB, QCL-TypeC or QCL-TypeD. The UE could also or instead equivalently implicitly assume that it can monitor aperiodic or semi-persistent BM resources. The UE could also or instead receive MAC-CE commands indicating TCI states to use jointly for demodulating the PDCCH and the PDSCH DMRSs.

In some embodiments, network equipment configures the UE with resources for Beam Management, Beam Failure Recovery and Beam Failure Detection using dedicated configurations. In another embodiment, network equipment could configure the UE with resources (e.g. SS/PBCH blocks, NZP CSI-RS) and set a parameter which specifies the purpose of the resource, e.g. any one or more of Beam Management, Beam Failure Recovery and Beam Failure Detection. An example of the NZP CSI-RS resource IE with such a field ("purpose") is given below:

```
-- ASN1START
-- TAG-NZP-CSI-RS-RESOURCE-START
NZP-CSI-RS-Resource::= SEQUENCE {
  nzp-CSI-RS-ResourceId NZP-CSI-RS-ResourceId,
  resourceMapping CSI-RS-ResourceMapping,
  powerControlOffset INTEGER (-8..15),
  powerControlOffsetSS ENUMERATED {db-3, db0, db3, db6} OPTIONAL,
  scramblingID ScramblingId,
  periodicityAndOffset CSI-ResourcePeriodicityAndOffset OPTIONAL,
  qcl-InfoPeriodicCSI-RS TCI-StateId OPTIONAL,
  purpose ENUMERATED {bm, bfr, bfd, bm-bfr, bm-bfd, bfr-bfd, bm-bfr-bfd},
  ...
}
-- TAG-NZP-CSI-RS-RESOURCE-STOP
-- ASN1STOP
```

In another embodiment, network equipment could configure the UE with BM NZP CSI-RS resources with an additional field indicating which SS/PBCH block the UE can use as a timing reference point in order to determine the timing reference for monitoring purposes. Equivalently, network equipment could configure the UE with a BM resource set containing NZP CSI-RS resources and an additional field indicating which SS/PBCH block the UE can use as a timing reference point in order to determine the timing reference for the resources defined in that BM resource set.

The present disclosure encompasses various embodiments, including the examples below.

According to an example 1, a method involves receiving, by a UE from a first base station, an indication signal for indicating to the UE a communication resource of a second reference signal from a higher-layer UE configuration from the first base station, the higher-layer configuration further comprising a communication resource for a first reference signal associated with the first base station and the communication resource for the second reference signal associated with a second base station; communicating, by the UE with the second base station, a data transmission or a control signal transmission using a respective data channel or control channel, the data channel or control channel associated with the communication resource of the second reference signal.

An example 2 relates to the method of example 1, further comprising: receiving, by the UE, the higher-layer configuration from the first base station.

An example 3 relates to the method of example 1 or example 2, wherein the indication signal comprises a QCL assumption.

An example 4 relates to the method of any one of examples 1 to 3, wherein the indication signal comprises a MAC-CE indication of the communication resource of the second reference signal.

An example 5 relates to the method of any one of examples 1 to 3, wherein the indication signal comprises a DCI indication of the communication resource of the second reference signal.

An example 6 relates to the method of any one of examples 1 to 3, wherein the indication signal comprises an RRC indication of the communication resource of the second reference signal.

An example 7 relates to the method of any one of examples 1 to 6, further comprising: performing, by the UE, channel measurements for a channel used for communicating a data transmission or a control signal transmission associated with the first base station; communicating, by the UE to the first base station, an indication of the channel measurements.

An example 8 relates to the method of any one of examples 1 to 7, wherein the higher-layer configuration further comprises a communication resource for beam failure recovery.

According to an example 9, a method involves: generating, by a first base station, an indication signal for indicating to a UE a communication resource of a second reference signal from a higher-layer configuration from the first base station to the UE, the higher-layer configuration comprising a communication resource for a first reference signal associated with the first base station and the communication resource for the second reference signal associated with a second base station; transmitting the indication signal from the first base station to the UE, to enable the UE to communicate with the second base station, a data transmission or a control signal transmission using a respective data channel or control channel, the data channel or control channel associated with the communication resource of the second reference signal.

An example 10 relates to the method of example 9, further comprising: transmitting, by the first base station, the higher-layer configuration to the UE.

An example 11 relates to the method of example 9 or example 10, wherein the indication signal comprises a QCL assumption.

An example 12 relates to the method of any one of examples 9 to 11, wherein the indication signal comprises a MAC-CE indication of the communication resource of the second reference signal.

An example 13 relates to the method of any one of examples 9 to 11, wherein the indication signal comprises a DCI indication of the communication resource of the second reference signal.

An example 14 relates to the method of any one of examples 9 to 11, wherein the indication signal comprises an RRC indication of the communication resource of the second reference signal.

An example 15 relates to the method of any one of examples 9 to 14, further comprising: receiving, by the first base station from the UE, an indication of channel measurements performed by the UE for a channel used for communicating a data transmission or a control signal transmission with the first base station.

An example 16 relates to the method of any one of examples 9 to 15, wherein the higher-layer configuration further comprises a communication resource for beam failure recovery.

According to an example 17, a UE comprises: a processor; and a non-transitory computer readable storage medium storing programming for execution by the processor, the programming including instructions to: receive, by the UE from a first base station, an indication signal for indicating to the UE a communication resource of a second reference signal from a higher-layer configuration from the first base station, the higher-layer configuration comprising a communication resource for a first reference signal associated with the first base station and the communication resource for the second reference signal associated with a second base station; communicate, by the UE with the second base station, a data transmission or a control signal transmission using a respective data channel or control channel, the data channel or control channel associated with the communication resource of the second reference signal.

An example 18 relates to the UE of example 17, wherein the programming further includes instructions to: receive, by the UE, the higher-layer configuration from the first base station.

An example 19 relates to the UE of example 17 or example 18, wherein the indication signal comprises a QCL assumption.

An example 20 relates to the UE of any one of examples 17 to 19, wherein the indication signal comprises a MAC-CE indication of the communication resource of the second reference signal.

An example 21 relates to the UE of any one of examples 17 to 19, wherein the indication signal comprises a DCI indication of the communication resource of the second reference signal.

An example 22 relates to the UE of any one of examples 17 to 19, wherein the indication signal comprises an RRC indication of the communication resource of the second reference signal.

An example 23 relates to the UE of any one of examples 17 to 22, wherein the programming further includes instructions to: perform, by the UE, channel measurements for a channel used for communicating a data transmission or a control signal transmission with the first base station; communicate, by the UE to the first base station, an indication of the channel measurements.

An example 24 relates to the UE of any one of examples 17 to 23, wherein the higher-layer configuration further comprises a communication resource for beam failure recovery.

According to an example 25, a base station comprises: a processor; and a non-transitory computer readable storage medium storing programming for execution by the processor, the programming including instructions to: generate, by the base station, an indication signal for indicating to a UE a communication resource of a second reference signal from a higher-layer configuration from the base station to the UE, the higher-layer configuration comprising a communication resource for a first reference signal associated with the base station and the communication resource for the second reference signal associated with a second base station; transmit the indication signal from the base station to the UE, to enable the UE to communicate with the second base station, a data transmission or a control signal transmission using a respective data channel or control channel, the data channel or control channel associated with the communication resource of the second reference signal.

An example 26 relates to the base station of example 25, wherein the programming further includes instructions to: transmit, by the base station, the higher-layer configuration to the UE.

An example 27 relates to the base station of example 25 or example 26, wherein the indication signal comprises a QCL assumption.

An example 28 relates to the base station of any one of examples 25 to 27, wherein the indication signal comprises a MAC-CE indication of the communication resource of the second reference signal.

An example 29 relates to the base station of any one of examples 25 to 27, wherein the indication signal comprises a DCI indication of the communication resource of the second reference signal.

An example 30 relates to the base station of any one of examples 25 to 27, wherein the indication signal comprises an RRC indication of the communication resource of the second reference signal.

An example 31 relates to the base station of any one of examples 25 to 30, wherein the programming further includes instructions to: receive, by the base station from the UE, an indication of channel measurements performed by the UE for a channel used for communicating a data transmission or a control signal transmission with the base station.

An example 32 relates to the base station of any one of examples 25 to 31, wherein the higher-layer configuration further comprises a communication resource for beam failure recovery.

According to an example 33, a computer program product comprises a non-transitory computer readable storage medium storing programming, the programming including instructions to perform the method of any one of examples 1 to 8.

According to an example 34, a computer program product comprises a non-transitory computer readable storage medium storing programming, the programming including instructions to perform the method of any one of examples 9 to 16.

What has been described is merely illustrative of the application of principles of embodiments of the present disclosure. Other arrangements and methods can be implemented by those skilled in the art.

For example, although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment could be combined with selected features of other example embodiments.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

Although the present disclosure has been described with reference to specific features and embodiments thereof, various modifications and combinations can be made thereto without departing from the disclosure. The description and drawings are, accordingly, to be regarded simply as an illustration of some embodiments of the disclosure as defined by the appended claims, and are contemplated to cover any and all modifications, variations, combinations or equivalents that fall within the scope of the present disclosure. Therefore, although the present disclosure and its advantages have been described in detail, various changes, substitutions and alterations can be made herein without departing from the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

In addition, although described primarily in the context of methods and apparatus, other implementations are also contemplated, as instructions stored on a non-transitory computer-readable medium, for example. Such media could store programming or instructions to perform any of various methods consistent with the present disclosure.

For example, a computer program product may comprise a non-transitory computer readable storage medium storing programming that includes instructions to perform a method as disclosed herein.

As another example, a non-transitory computer readable storage medium may store programming for execution by a processor, with the programming including instructions to perform a method as disclosed herein. In an embodiment, the programming including instructions to: receive, by a user equipment (UE) from a first base station, an indication signal for indicating to the UE a communication resource for a second reference signal associated with a second base station, wherein the communication resource for the second reference signal is comprised in a higher-layer configuration from the first base station to the UE, and the higher-layer configuration further comprises a communication resource for a first reference signal associated with the first base station; and communicate, by the UE with the second base station, a data transmission or a control signal transmission using a respective data channel or control channel, the data channel or control channel associated with the communication resource for the second reference signal.

Any of various features, such as any one or more of the following in any combination, may be provided in computer program product and/or non-transitory computer readable storage medium embodiments:

the programming further includes instructions to receive, by the UE, the higher-layer configuration from the first base station;

the indication signal is or includes QCL information;

the indication signal is or includes a MAC-CE indication of the communication resource for the second reference signal;

the indication signal is or includes a DCI indication of the communication resource for the second reference signal;

the indication signal is or includes an RRC indication of the communication resource for the second reference signal;

the programming further includes instructions to perform, by the UE, channel measurements for a channel used for communicating a data transmission or a control signal transmission with the first base station;

the programming further includes instructions to communicate, by the UE to the first base station, an indication of the channel measurements;

the programming further includes instructions to perform, by the UE, channel measurements for the data channel or control channel;

the programming further includes instructions to communicate, by the UE to the second base station, an indication of the channel measurements for the data channel or the control channel;

the higher-layer configuration further comprises a communication resource for beam failure recovery.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and nonremovable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A method comprising:

receiving, by a user equipment (UE) from a first base station, a higher-layer configuration comprising a physical downlink shared channel (PDSCH) configuration information element (IE) that comprises: a first communication resource for a first reference signal associated with the first base station; and a second communication resource for a second reference signal associated with a second base station, wherein a first physical cell identity associated with the first base station is different from a second physical cell identity associated with the first base station;

performing, by the UE, channel measurements for a channel used for communicating with the first base station and the second base station and communicating, by the UE to the first base station, a report of the channel measurements;

receiving, by the UE from the first base station based on the channel measurements, a medium access control-control element (MAC-CE) command comprising an active indication field for activation of a Transmission Configuration Indicator (TCI) state for the second reference signal, the active indication field having a value to indicate that the TCI state is active;

communicating by the UE with the second base station, in response to the MAC-CE command and without radio resource control (RRC) signaling to trigger the communicating, a data signal transmission or a control signal transmission using a respective data channel or control channel associated with the TCI state, wherein the TCI state comprises Quasi-Colocation (QCL) information with a QCL assumption associated with the second reference signal, to use for communicating, by the UE with the second base station, the respective data channel or control channel, wherein the higher-layer configuration configures a list of QCL assumptions, including the QCL assumption associated with the second reference signal and a QCL assumption associated with the first reference signal, that link the second reference signal and the first reference signal to reference signals defined in a beam management module of the UE, wherein the higher-layer configuration comprises a variable for the UE to maintain a TCI-state list and QCL assumptions separately from cell-specific configuration.

2. The method of claim 1,
wherein receiving the higher-layer configuration comprises receiving, by the UE from the first base station, RRC signaling indicating the TCI state for the second reference signal and a TCI state for the first reference signal.

3. The method of claim 2, further comprising:
performing beam switching, by the UE, to switch from a first beam provided by the first base station to a second beam provided by the second base station in response to the MAC-CE command and based on the beam management module, without first completing RRC reconfiguration.

4. The method of claim 2,
wherein the QCL information indicates a Synchronization Signal and Physical Broadcast Channel (SS/PBCH) block (SSB) resource,
wherein the TCI state for the first reference signal indicates the first physical cell identity associated with the first base station and the TCI state for the second reference signal indicates the second physical cell identity associated with the second base station.

5. The method of claim 4, wherein the SSB resource is indicated in an information element that further comprises the second physical cell identity.

6. The method of claim 5, wherein the information element further comprises an index associated with the SSB resource and/or a frequency associated with the SSB resource.

7. The method of claim 2,
wherein the TCI state for the first reference signal indicates the first physical cell identity associated with the first base station and the TCI state for the second reference signal indicates the second physical cell identity associated with the second base station.

8. The method of claim 1, wherein the MAC-CE command indicates a beam management resource set and a QCL assumption to use for resources in the beam management resource set, the method further comprising:
monitoring, by the UE, the resources in the beam management resource set using a priority rule; and
applying the QCL assumption for each resource in the beam management resource set towards demodulation of the second reference signal.

9. The method of claim 1,
wherein the higher-layer configuration indicates one or more Synchronization Signal and Physical Broadcast Channel (SS/PBCH) block or non-zero power channel state information reference signal (NZP CSI-RS) resources associated with the first reference signal and the second reference signal.

10. The method of claim 1,
wherein the QCL assumption is QCL typeC and/or QCL typeD and the second reference signal is a Synchronization Signal and Physical Broadcast Channel (SS/PBCH) block.

11. The method of claim 1,
wherein the QCL assumption is QCL typeA and/or QCL typeD and the second reference signal is a non-zero power channel state information reference signal (NZP CSI-RS).

12. The method of claim 1,
wherein the linkage of the second reference signal and the first reference signal to reference signals defined in the beam management resource is established by configuring a QCL information object in a physical channel,
wherein the physical channel comprises the respective data channel or control channel associated with the TCI state.

13. The method of claim 1, wherein the beam management module is separate from a module to hold cell-specific configuration.

14. The method of claim 1, further comprising, for each of a plurality of TCI state identifiers included in the higher-layer configuration:
if an entry with a matching TCI state identifier exists within the variable at the UE, reconfiguring the entry with the value received for the TCI state;
if an entry with a matching TCI state identifier does not exist within the variable at the UE, adding a new entry within the variable for the received TCI state identifier.

15. An apparatus at a side of a user equipment (UE), comprising:
a processor; and
a non-transitory computer readable storage medium storing programming for execution by the processor, the programming including instructions to:
receive from a first base station, a higher-layer configuration comprising a physical downlink shared channel (PDSCH) configuration information element (IE) that comprises: a first communication resource for a first reference signal associated with the first base station; and a second communication resource for a second reference signal associated with a second base station, wherein a first physical cell identity associated with the first base station is different from a second physical cell identity associated with the first base station;
perform channel measurements for a channel used for communicating with the first base station and the second base station and communicate to the first base station, a report of the channel measurements;
receive from the first base station, a medium access control-control element (MAC-CE) command comprising an active indication field for activation of a Transmission Configuration Indicator (TCI) state for the second reference signal, the active indication field having a value to indicate that the TCI state is active;
communicate with the second base station, in response to the MAC-CE command and without radio resource control (RRC) signaling to trigger the apparatus to communicate with the second base station, a data signal transmission or a control signal transmission using a respective data channel or control channel, the data channel or control channel associated with the TCI state,
wherein the TCI state comprises Quasi-Colocation (QCL) information with a QCL assumption associated with the second reference signal, to use for communicating, with the second base station, the respective data channel or control channel, wherein the higher-layer configuration configures a list of QCL assumptions, including the QCL assumption associated with the second reference signal and a QCL assumption associated with the first reference signal, that link the second reference signal and the first reference signal to reference signals defined in a beam management module of the UE, wherein the higher-layer configuration comprises a variable for the UE to maintain a TCI-state list and QCL assumptions separately from cell-specific configuration.

16. The apparatus of claim 15, wherein the instructions to receive the higher-layer configuration comprise instructions to receive, from the first base station, RRC signaling indicating the TCI state for the second reference signal and a TCI state for the first reference signal.

17. The apparatus of claim 12, wherein the programming further includes instructions to:

perform beam switching to switch from a first beam provided by the first base station to a second beam provided by the second base station in response to the MAC-CE command and based on the beam management module, without first completing RRC reconfiguration.

18. A computer program product comprising a non-transitory computer readable storage medium storing programming, the programming including instructions to:

receive from a first base station, a higher-layer configuration comprising a physical downlink shared channel (PDSCH) configuration information element (IE) that comprises: a first communication resource for a first reference signal associated with the first base station; and a second communication resource for a second reference signal associated with a second base station, wherein a first physical cell identity associated with the first base station is different from a second physical cell identity associated with the first base station;

perform channel measurements for a channel used for communicating with the first base station and the second base station and communicate to the first base station, a report of the channel measurements;

receive from the first base station, a medium access control-control element (MAC-CE) command comprising an active indication field for activation of a Transmission Configuration Indicator (TCI) state for the second reference signal, the active indication field having a value to indicate that the TCI state is active;

in response to the MAC-CE command and without radio resource control (RRC) signaling to trigger, communicate with the second base station, a data signal transmission or a control signal transmission using a respective data channel or control channel, the data channel or control channel associated with the TCI state, wherein the TCI state comprises Quasi-Colocation (QCL) information with a QCL assumption associated with the second reference signal, to use for communicating, with the second base station, the respective data channel or control channel, wherein the higher-layer configuration configures a list of QCL assumptions, including the QCL assumption associated with the second reference signal and a QCL assumption associated with the first reference signal, that link the second reference signal and the first reference signal to reference signals defined in a beam management module of the UE, wherein the higher-layer configuration comprises a variable for the UE to maintain a TCI-state list and QCL assumptions separately from cell-specific configuration.

19. A non-transitory computer readable storage medium storing programming for execution by a processor, the programming including instructions to:

receive from a first base station, a higher-layer configuration comprising a physical downlink shared channel (PDSCH) configuration information element (IE) that comprises: a first communication resource for a first reference signal associated with the first base station; and a second communication resource for a second reference signal associated with a second base station, wherein a first physical cell identity associated with the first base station is different from a second physical cell identity associated with the first base station;

perform channel measurements for a channel used for communicating with the first base station and the second base station and communicate to the first base station, a report of the channel measurements;

receive from the first base station, a medium access control-control element (MAC-CE) command comprising an active indication field for activation of a Transmission Configuration Indicator (TCI) state for the second reference signal, the active indication field having a value to indicate that the TCI state is active;

in response to the MAC-CE command and without radio resource control (RRC) signaling to trigger, communicate with the second base station, a data signal transmission or a control signal transmission using a respective data channel or control channel, the data channel or control channel associated with the TCI state, wherein the TCI state comprises Quasi-Colocation (QCL) information with a QCL assumption associated with the second reference signal, to use for communicating, with the second base station, the respective data channel or control channel, wherein the higher-layer configuration configures a list of QCL assumptions, including the QCL assumption associated with the second reference signal and a QCL assumption associated with the first reference signal, that link the second reference signal and the first reference signal to reference signals defined in a beam management module of the UE, wherein the higher-layer configuration comprises a variable for the UE to maintain a TCI-state list and QCL assumptions separately from cell-specific configuration.

20. The non-transitory computer readable storage medium of claim 19, wherein the instructions to receive the higher-layer configuration comprise instructions to receive, from the first base station, RRC signaling indicating the TCI state for the second reference signal and a TCI state for the first reference signal.

21. A method comprising:

receiving, by a user equipment (UE) from a first base station, a higher-layer configuration comprising a physical downlink shared channel (PDSCH) configuration information element (IE) that comprises: a first communication resource for a first reference signal associated with the first base station; and a second communication resource for a second reference signal associated with a second base station, wherein a first physical cell identity associated with the first base station is different from a second physical cell identity associated with the first base station;

performing, by the UE, channel measurements for a channel used for communicating with the first base station and the second base station and communicating, by the UE to the first base station, a report of the channel measurements;

receiving, by the UE from the first base station based on the channel measurements, a medium access control-control element (MAC-CE) command comprising an active indication field for activation of a Transmission Configuration Indicator (TCI) state for the second reference signal, the active indication field having a value to indicate that the TCI state is active;

communicating by the UE with the second base station, in response to the MAC-CE command and without radio resource control (RRC) signaling to trigger the communicating, a data signal transmission or a control signal transmission using a respective data channel or control channel associated with the TCI state, wherein the TCI state comprises Quasi-Colocation (QCL) information with a QCL assumption associated with the second reference signal, to use for communicating, by the UE with the second base station, the respective data channel or control channel, wherein the higher-layer configuration configures a list of QCL assumptions, including the QCL assumption associated with the second reference signal and a QCL assumption associated with the first reference signal, that link the second reference signal and the first reference signal to reference signals defined in a beam management module of the UE, wherein the higher-layer configuration comprises respective identifiers of TCI states that associate downlink reference signals including the first reference signal and the second reference signal with QCL assumptions and uniquely identify the downlink reference signals and a set of one or more QCL assumptions, wherein performing the channel measurements comprises performing the channel measurements based on QCL assumptions derived from TCI states identified by identifiers provided in the higher-layer configuration.

* * * * *